(12) United States Patent
Paul et al.

(10) Patent No.: US 7,945,665 B2
(45) Date of Patent: May 17, 2011

(54) CENTRALIZED LOAD DISTRIBUTION FOR AN H.323 NETWORK

(75) Inventors: Manoj Paul, Karnataka (IN); Srinivasa R. Beereddy, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 2456 days.

(21) Appl. No.: 10/338,762

(22) Filed: Jan. 8, 2003

(65) Prior Publication Data

US 2004/0133677 A1 Jul. 8, 2004

(51) Int. Cl.
*G06F 15/173* (2006.01)
(52) U.S. Cl. ....................................................... 709/225
(58) Field of Classification Search .................. 709/225, 709/224, 226, 223
See application file for complete search history.

(56) References Cited

U.S. PATENT DOCUMENTS

| | | | | |
|---|---|---|---|---|
| 6,404,864 | B1 * | 6/2002 | Evslin et al. | 379/112.01 |
| 6,584,093 | B1 * | 6/2003 | Salama et al. | 370/351 |
| 6,591,301 | B1 * | 7/2003 | Li et al. | 709/229 |
| 6,738,383 | B1 * | 5/2004 | Kliland et al. | 370/401 |
| 6,985,957 | B2 * | 1/2006 | Fujita | 709/229 |
| 7,080,151 | B1 * | 7/2006 | Borella et al. | 709/230 |
| 2002/0015383 | A1 | 2/2002 | Ueno | |
| 2003/0123635 | A1 * | 7/2003 | Lee | 379/220.01 |
| 2004/0120501 | A1 * | 6/2004 | Celi et al. | 379/265.01 |

* cited by examiner

*Primary Examiner* — John Follansbee
*Assistant Examiner* — Alan S Chou
(74) *Attorney, Agent, or Firm* — Buckley, Maschoff & Talwalkar LLC

(57) ABSTRACT

According to some embodiments, centralized load distribution is proved for an H.323 network.

28 Claims, 24 Drawing Sheets

| GATEKEEPER IDENTIFIER 402 | CURRENT REGISTRATION LOAD 404 | ACCEPT FURTHER RRQ MESSAGES 406 | CURRENT CALL LOAD 408 | ACCEPT FURTHER ARQ MESSAGES 410 |
|---|---|---|---|---|
| GK_101 | .85 | NO | .40 | YES |
| GK_102 | .55 | YES | .60 | YES |
| GK_103 | .15 | YES | .70 | NO |

CENTRALIZED LOAD DISTRIBUTION FOR AN H.323 NETWORK

BACKGROUND

Various devices in an H.323 network may exchange information, such as voice or other multimedia information in accordance with the International Telecommunication Union (ITU) Recommendation H.323 entitled "Packet-based Multimedia Communications System" (November, 2000). In general, H.323 is a multimedia conferencing protocol associated with voice, video, and/or data conferencing via a packet switched network, such as an Internet Protocol (IP) network. For example, FIG. 1 is an illustration of a known H.323 network 100. The network 100 includes two administrative domains 110, each including a single border element 140. Within each administrative domain 110, a number of gatekeepers 120 are each associated with a number of endpoints 130.

The endpoints 130 may comprise, for example, telephones, video phones, or Personal Computers (PCs). Each endpoint 130 registers with one of the gatekeepers 120 in its administrative domain 110 to facilitate an exchange of information with other endpoints 130.

The gatekeepers 120 perform admission control, bandwidth management, and address resolution functions within the network 100. In addition, a gatekeeper 120 may allow a call to be placed directly between two endpoints 130 or may instead route the call signaling itself.

The border elements 140 control the gatekeepers 120 within its administrative domain 110, exchange addressing information, and participate in call authorization between administrative domains 110. Note that a border element 140 may be co-located with a gatekeeper 120.

When an endpoint 130 is powered-up, it multicasts a Gatekeeper Discovery (GRQ) message to all of the gatekeepers 120 within its administrative domain 110. Any available gatekeepers 120 respond with a Gatekeeper Confirmation (GCF) message. A gatekeeper 120 that is not available might ignore the GRQ message or respond with a Gatekeeper Reject (GRJ) message (perhaps including a list of alternate gatekeepers 120 that might be able to accept the endpoint 130). If the endpoint 130 receives multiple GCF messages, it simply selects any one of the available gatekeepers 120.

After discovering an available gatekeeper 120, the endpoint 130 transmits a Registration Request (RRQ) message to that gatekeeper 120. Note that instead of transmitting a multicast GRQ message, an endpoint 130 sometimes transmits an RRQ message directly to a particular gatekeeper 120 (e.g., when the endpoint 130 already knows the address of that particular gatekeeper 120).

When a gatekeeper 120 receives an RRQ message, it responds with a Registration Confirm (RCF) message if sufficient resources are available to support that endpoint 130. If sufficient resources are not available, the gatekeeper 120 instead responds with a Registration Reject (RRJ) message.

After being registered, the endpoint 130 requests admission to make or receive a call by transmitting an Admission Request (ARQ) message to its gatekeeper 120. The gatekeeper 120 may then respond with an Admission Confirm (ACF) message if it has enough resources to support the call (e.g., when the gatekeeper 120 would need actually route the call through itself). If the gatekeeper 120 does not have enough resources, it may instead transmit an Admission Reject (ARJ) message to the endpoint 130.

Note that different gatekeepers 120 within an administrative domain 110 may have different registration loads and/or call loads. For example, one gatekeeper 120 might have registered a large number of endpoints 130 while another gatekeeper 120 registered only a few endpoints 130. As a result, the distribution of traffic through the network 110 may not be balanced—and the exchange of information between endpoints 130 may be degraded.

To avoid this situation, it is known that every gatekeeper 120 can store load information associated with every other gatekeeper 120 within the administrative domain 110. Each gatekeeper 120 can then accept or reject RRQ/ARQ messages based on that information. This approach, however, can be impractical when there a large number of gatekeepers 120 within an administrative domain 110 (e.g., because of the amount of information that each gatekeeper 120 must store about the other gatekeepers 120 and/or the amount of traffic that is required between the gatekeepers 120).

BRIEF DESCRIPTION OF THE DRAWINGS

FIG. 4 illustrates a database that might be associated with a load distribution element according to some embodiments.

DETAILED DESCRIPTION

Some embodiments described herein are associated with an "H.323 network." As used herein, the phrase "H.323 network" may refer to other multimedia conferencing protocols associated with voice, video, and/or data conferencing via a packet switched network, such as future versions of ITU Recommendation H.323.

Load Distribution Element

Figure 1:
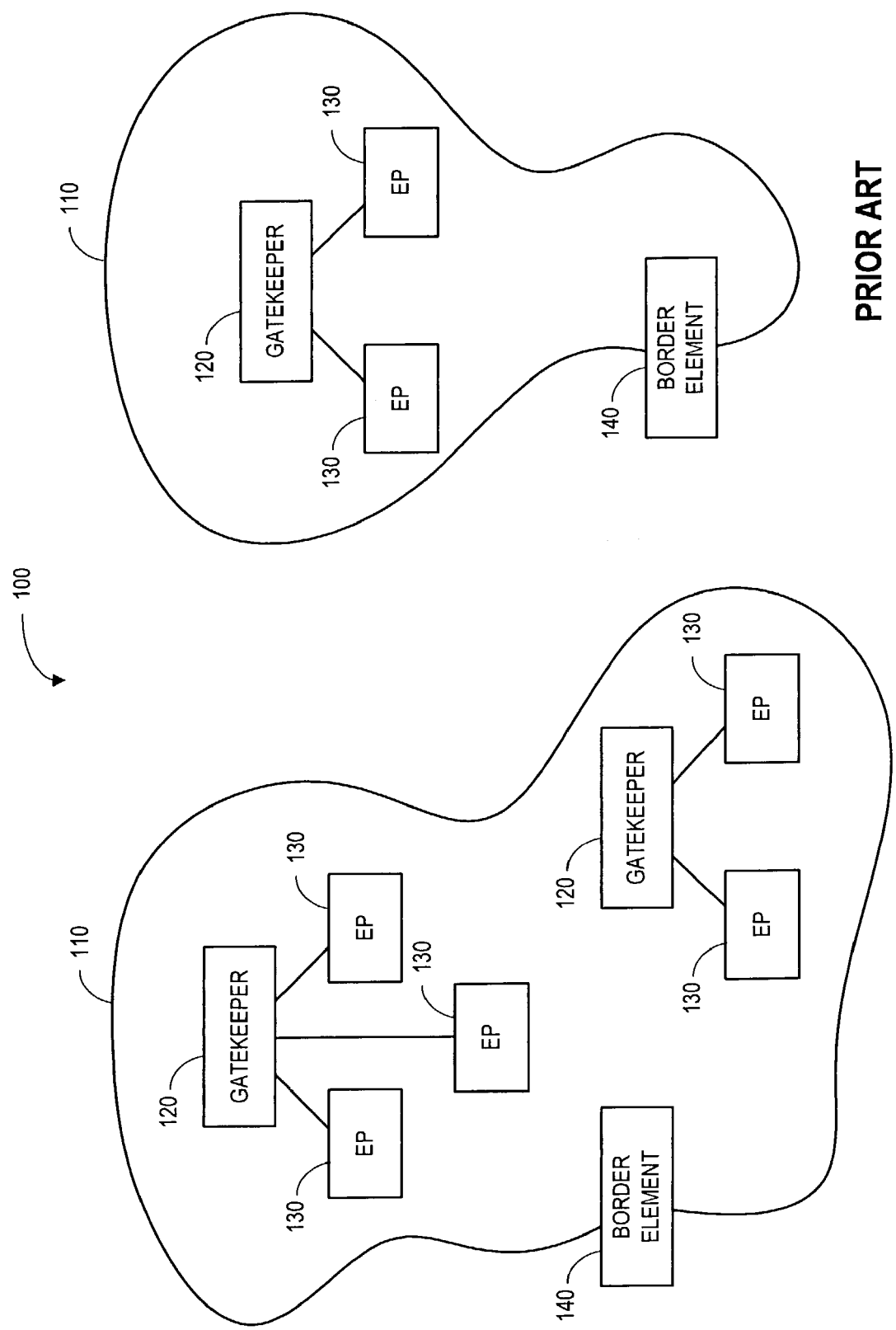
FIG. 1 is an illustration of a known H.323 network.
Figure 2:
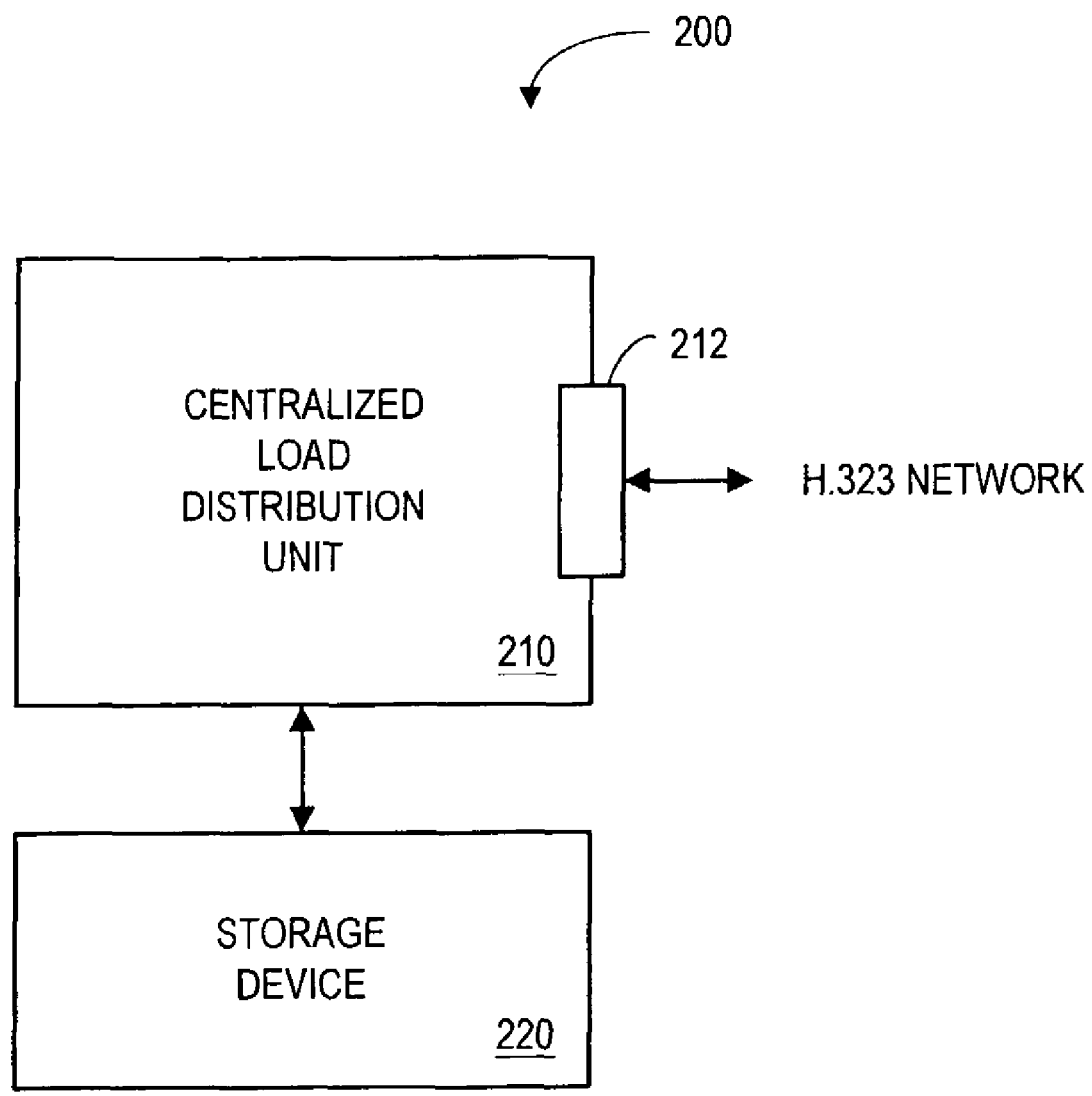
FIG. 2 is a block diagram of a load distribution element according to some embodiments.

FIG. 2 is a block diagram of a load distribution element 200 according to some embodiments. The load distribution element 200 may, for example, balance current loads (e.g., registration and/or call loads) between gatekeepers within an administrative domain in a centralized fashion.

The load distribution element 200 includes a storage device 220 to store load information associated with a plurality of gatekeepers in an H.323 network. The load information may represent, for example, the current registration load of each gatekeeper within an administrative domain. As another example, the load information may represent each gatekeeper's current call load.

The load distribution element 200 also includes a "centralized" load distribution unit 210 to adjust a load associated with one gatekeeper based on load information associated with at least one other gatekeeper. For example, load information for gatekeepers within an administrative domain may be centrally stored at a border element and used to balance loads between gatekeepers. The load distribution element 200 further includes a communication port 212 to exchange information with other devices (e.g., endpoints, gatekeepers, and/or border elements).

Figure 3:
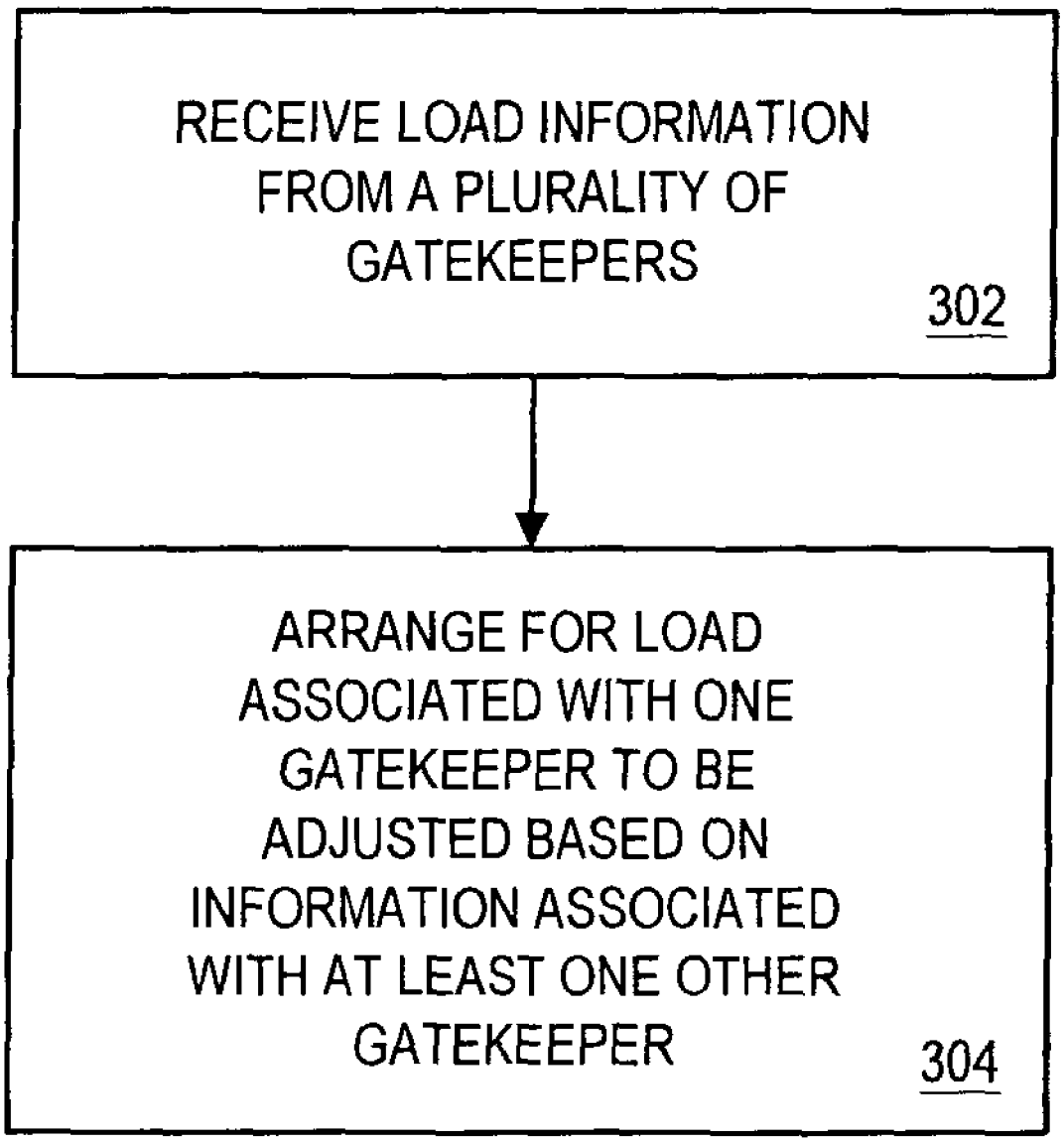
FIG. 3 is a flow chart of a method that may be performed by a load distribution element according to some embodiments.

FIG. 3 is a flow chart of a method that may be performed by a load distribution element 200 according to some embodiments. The flow charts described herein do not necessarily imply a fixed order to the actions, and embodiments may be performed in any order that is practicable. At 302, load information is received from a plurality of gatekeepers in an H.323 network. For example, the centralized load distribution unit 210 might transmit a load state query to each gatekeeper. Each gatekeeper may then transmit a load state query response to the centralized load distribution unit 210. According to another embodiment, a gatekeeper may decide on its own to send load information to the centralized load distribution unit 210 (e.g., when its current registration or call load falls below or rises above a pre-determined threshold value). In either case, the centralized load distribution unit 210 may store the appropriate information in the storage device 220.

At 304, it is arranged for a load associated with one gatekeeper to be adjusted based on load information associated with at least one other gatekeeper. For example, the centralized load distribution unit 210 may determine that a gatekeeper's current registration load is high as compared to other gatekeepers and therefore instruct that gatekeeper to reject further RRQ message from endpoints. As another example, the centralized load distribution unit 210 may determine that a gatekeeper's current call load is low as compared to other gatekeepers and therefore instruct that gatekeeper to accept further ARQ message from endpoints.

Note that any of the methods described herein may be performed by hardware, software (including microcode), or a combination of hardware and software. For example, a medium may store instructions adapted to be executed by a processor to perform the method of FIG. 3.

FIG. 4 illustrates a database 400 that might be associated with a load distribution element 200 (e.g., the database 400 may be stored in the storage device 220) according to some embodiments. Note that although a particular set and arrangement of information is shown in FIG. 4, other information may be stored in the database and/or other arrangements may be used.

Each entry in the database 400 table includes a gatekeeper identifier 402 associated with a gatekeeper within an administrative domain. Note that the gatekeeper identifier 402 might be assigned by the centralized load distribution unit 210 or might instead be associated with each gatekeepers address.

For each gatekeeper, a current registration load 404 is stored in the database 400. The current registration load 404 might represent, for example, the number of endpoints that are currently registered with the gatekeeper divided by the maximum number of endpoint registrations that can be supported by that particular gatekeeper. Moreover, the database 400 indicates whether or not further RRQ messages should be accepted 406 by that gatekeeper. For example, as illustrated in FIG. 4, GK_101 has a relatively high registration load (i.e., 85%) and therefore should not accept further RRQ messages. On the other hand, GK_102 has a relatively low registration load (i.e., 55%) and therefore should accept further RRQ messages.

Similarly, a current call load 408 is stored for each gatekeeper. The current call load 408 might represent, for example, the number of calls that are currently routed through the gatekeeper divided by the maximum number of calls that can be routed by that particular gatekeeper. Moreover, the database 400 indicates whether or not further ARQ messages should be accepted 410 by that gatekeeper. For example, GK_103 has a relatively high call load (i.e., 70%) and therefore should not accept further ARQ messages. On the other hand, GK_102 has a relatively low registration load (i.e., 60%) and therefore should accept further ARQ messages.

Gatekeeper

Figure 5:
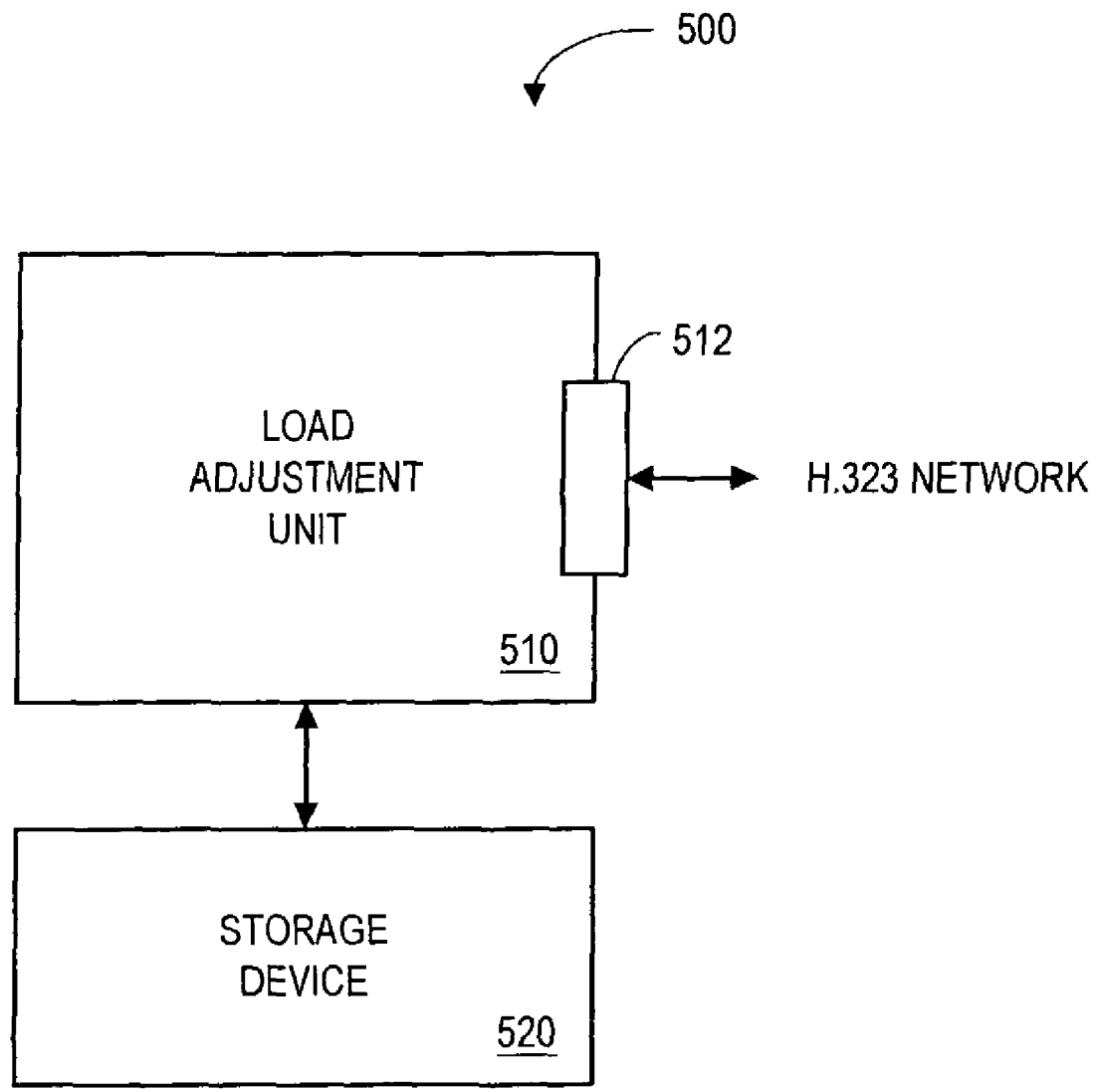
FIG. 5 is a block diagram of a gatekeeper according to some embodiments.

FIG. 5 is a block diagram of a gatekeeper 500 including a load adjustment unit 510 and a storage device 520 according to some embodiments. The load adjustment unit 510 may, for example, provide current load information (e.g., registration and/or call load information) to a load distribution element 200 (e.g., a border element). Moreover, the current load information may be stored in the storage device 520.

The load adjustment unit 510 may also receive instructions from the load distribution element 200 (e.g., indicating whether or not that gatekeeper should accept further RRQ and/or ARQ messages from endpoints). The load adjustment unit 510 includes a communication port 512 to exchange information with other devices (e.g., endpoints, gatekeepers, and/or border elements).

Figure 6:
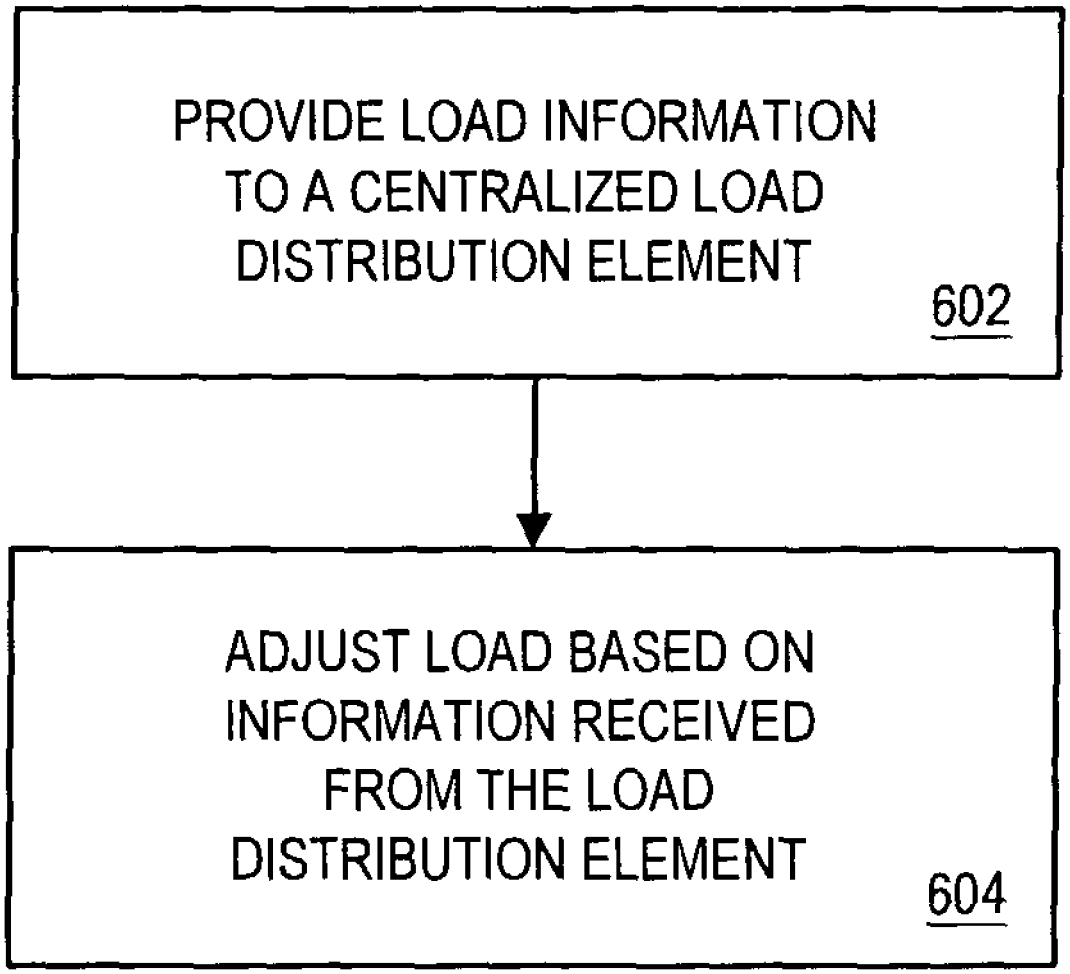
FIG. 6 is a flow chart of a method that may be performed by a gatekeeper according to some embodiments.

FIG. 6 is a flow chart of a method that may be performed by the gatekeeper 500 according to some embodiments. At 602, load information is provided to a centralized load distribution element 200. For example, the gatekeeper 500 might transmit a load state query response to the load distribution element 200. As other examples, the gatekeeper 500 might simply decide on its own to transmit a load state high (or load state low) indication to the load distribution element 200 (e.g., based on a pre-determined threshold load value).

Figure 7:
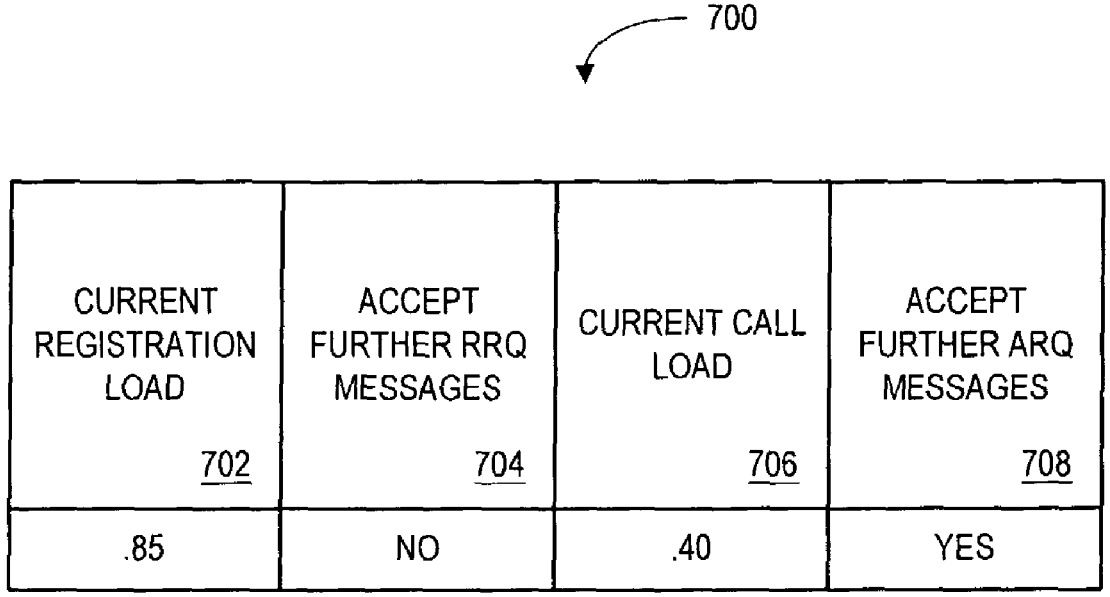
FIG. 7 illustrates a database that might be associated with a gatekeeper according to some embodiments.

FIG. 7 illustrates a database 700 that might be associated with a gatekeeper 500 (e.g., the database 700 may be stored in the storage device 520) according to some embodiments. Note that although a particular set and arrangement of information is shown in FIG. 7, other information may be stored in the database and/or other arrangements may be used.

A current registration load 702 is stored in the database 700. The current registration load 702 might represent, for example, the number of endpoints that are currently registered with the gatekeeper 500 divided by the maximum number of endpoint registrations that can be supported by the gatekeeper 500. Moreover, the database 700 indicates whether or not further RRQ messages should be accepted 704 (e.g., based on information received from a load distribution element 200). For example, as illustrated in FIG. 7, the gatekeeper 500 has a current registration load of 85% and will not accept further RRQ messages from endpoints (e.g., because an 85% registration load is high as compared to the other gatekeepers in the administrative domain).

Similarly, a current call load 706 is stored for the gatekeeper. The current call load 706 might represent, for example, the number of calls that are currently routed through the gatekeeper 500 divided by the maximum number of calls that can be routed by the gatekeeper 500. Moreover, the database 700 indicates whether or not further ARQ messages should be accepted 708. For example, the gatekeeper 500 has a current call load of 40% and will accept further ARQ messages from endpoints (e.g., because a 40% call load is low as compared to the other gatekeepers in the administrative domain).

Information Flow

Figure 8:
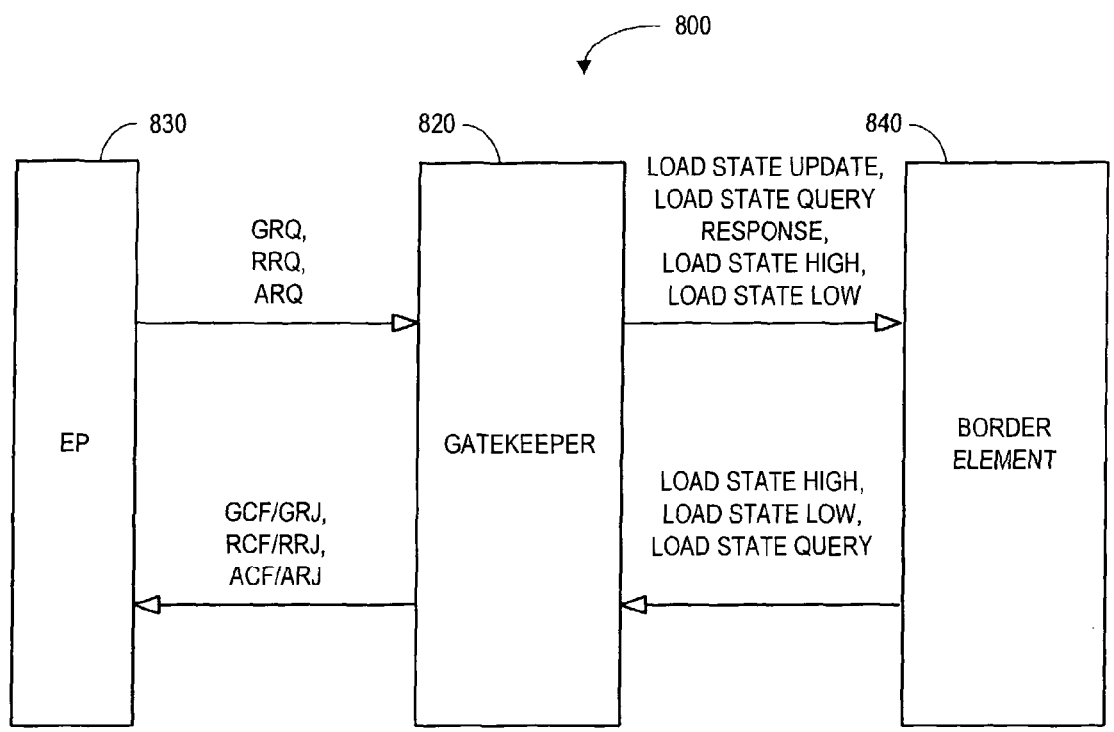
FIG. 8 is an information flow diagram according to some embodiments.

FIG. 8 is an information flow diagram 800 according to some embodiments. In particular, an endpoint 830 may transmit a GRQ message, an RRQ message, and/or an ARQ message to a gatekeeper 820. The gatekeeper 820 may then respond by transmitting a GCF (or GRJ) message, a RCF (or RRJ) message, and/or an ACF (or ARJ) message to the endpoint 830 as appropriate.

According to some embodiments, a border element (e.g., acting as the load distribution element 200) may also transmit a load state query to the gatekeeper 820. In response, the gatekeeper 820 may transmit load information to the border element 840. For example, the gatekeeper 820 might transmit a load state query response to the border element 840 including a specific registration and/or call load value (e.g., 10%). As another example, the gatekeeper 820 might simply transmit an indication of whether its current registration and/or call load is "high" or "low."

According to some embodiments, the gatekeeper 820 can decide to transmit load information to the border element 840. For example, the gatekeeper 820 might transmit load information to the border element 840 on a period basis. As another example, the gatekeeper 820 might transmit load information to the border element 840 based on one or more pre-determined threshold values (e.g., when the current registration load exceeds 90%).

The border element 840 may also instruct the gatekeeper 820 as to whether or not further RRQ messages and/or ARQ messages should be accepted from endpoints 830 (e.g., by informing the gatekeeper 820 that its current load is "high" or "low" as compared to the other gatekeepers 820 within the administrative domain).

EXAMPLE

Some detailed examples of messages and methods that might be used in accordance with some embodiments will now be provided with respect to FIGS. 9 through 24. In particular:

$$L(\text{Reg})=[\text{number of current registrations/maximum number of registrations}]*100; \text{ and}$$

$$L(\text{Call})=[\text{number of current calls/maximum number of calls}]*100.$$

According to other embodiments, L(Reg) and L(Call) may be based on other information (e.g., that actual amount of traffic associated with calls currently being routed by a gatekeeper).

Moreover, a gatekeeper will transmit a "Load Status Update" message to the border element to indicate both its L(Reg) status and L(Call) status. Note that a single Load Status Update message might include bother L(Reg) information and L(Call) information, or separate messages could instead be transmitted to the border element.

The border element will transmit a "Load State High" message to a gatekeeper when that gatekeeper has a relatively high L(Reg) and/or L(Call) as compared to other gatekeepers in the administrative domain. The Load State High message indicates that the gatekeeper should stop processing endpoint registrations and/or calls. According to some embodiments, the message further includes a list of alternate gatekeepers that each have a relatively low L(Reg) and/or L(Call).

A gatekeeper may also transmit a Load State High message to the border element.

In this case, the gatekeeper is indicating that its L(Reg) and/or L(Call) have reached a pre-determined threshold limit (e.g., and that it will no longer accept RRQ or ARQ messages from endpoints).

Similarly, the border element will transmit a "Load State Low" message to a gatekeeper when that gatekeeper has a relatively low L(Reg) and/or L(Call) as compared to other gatekeepers in the administrative domain. The Load State Low message indicates that the gatekeeper should now accept additional endpoint registrations and/or calls. As before, a gatekeeper may also send a Load State Low message to the border element. In this case, the gatekeeper is indicating that its L(Reg) and/or L(Call) have reached a pre-determined threshold limit (e.g., and that it will again accept RRQ or ARQ messages from endpoints).

Finally, the border element may transmit a Load State Query to gatekeepers (e.g., on a periodic basis) and gatekeepers may provide the appropriate load information by transmitting a Load State Query Response to the border element.

According to some embodiments, existing H.323 Location Request (LRQ) messages, Location Confirm (LCF) messages, and/or Location Reject (LRJ) messages may be used to implement the interface messages described herein (e.g., by adding new information elements to the existing messages).

Figure 9:
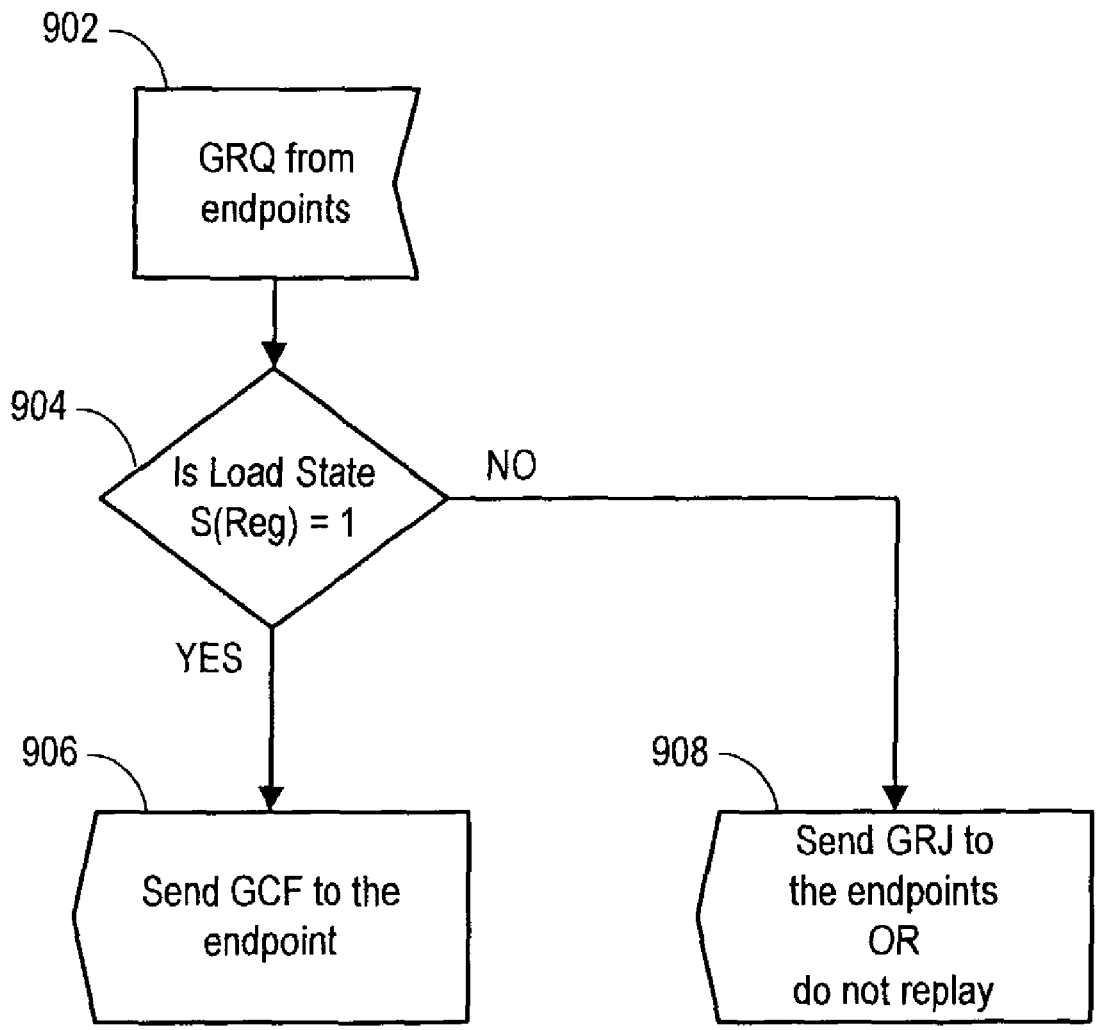
FIG. 9 is a flow chart of a GRQ method that may be performed by a gatekeeper according to some embodiments.

Referring again to the drawings, FIG. 9 is a flow chart of a GRQ method that may be performed by a gatekeeper according to some embodiments. In particular, when a GRQ message is received from an endpoint at 902, the gatekeeper determines the value of S(Reg) representing the gatekeeper's current registration load state. If S(Reg) equals 0 at 904, the gatekeeper will either transmit a GRJ message to the endpoint or simply ignore the GRQ message at 908. If S(Reg) equals 1, the gatekeeper transmits a GCF message to the endpoint at 906.

Figure 10:
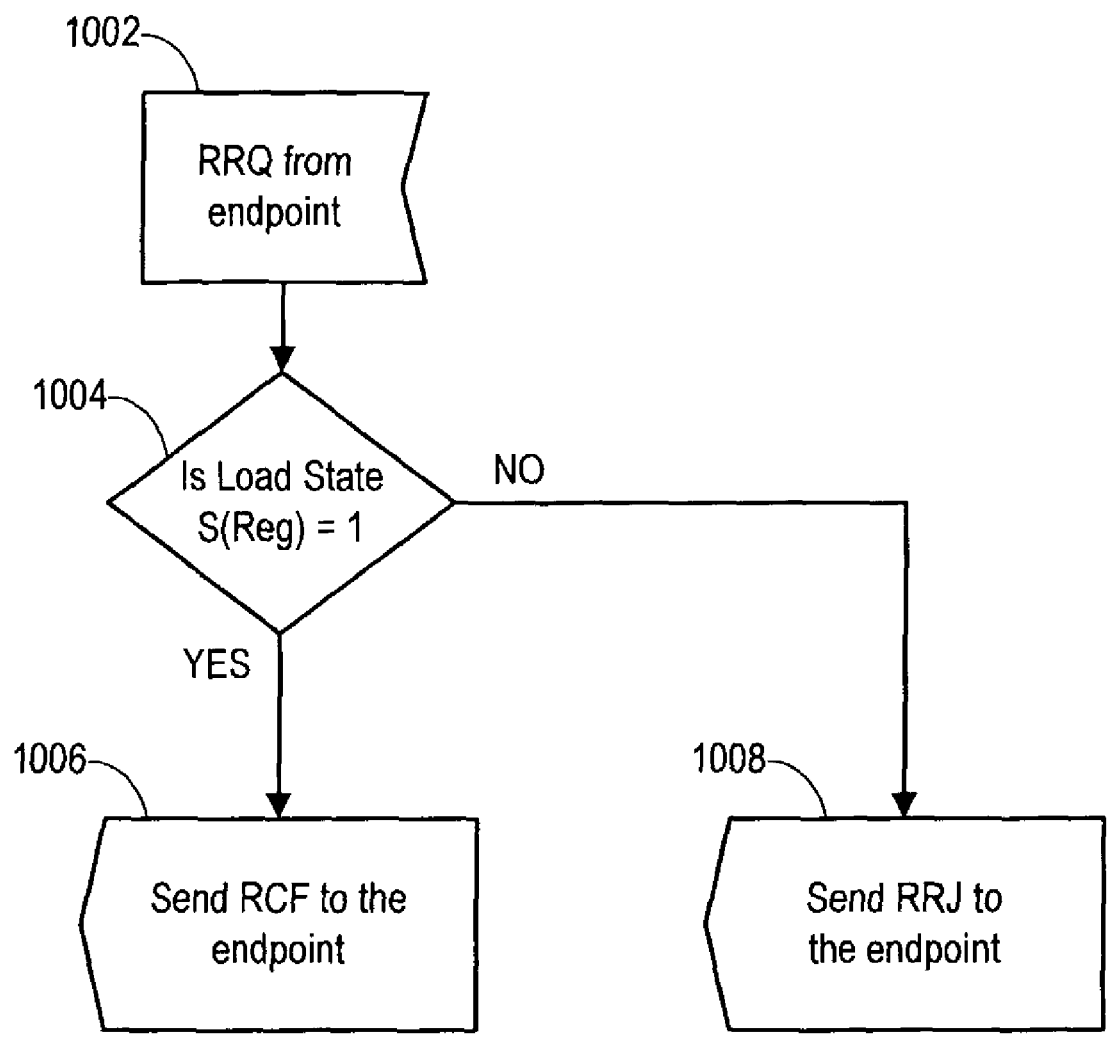
FIG. 10 is a flow chart of an RRQ method that may be performed by a gatekeeper according to some embodiments.

FIG. 10 is a flow chart of an RRQ method that may be performed by a gatekeeper according to some embodiments.

When an RRQ message is received from an endpoint at 1002, the gatekeeper determines the value of S(Reg) representing the gatekeeper's current registration load state. If S(Reg) equals 0 at 1004, the gatekeeper will either transmit a RRJ message to the endpoint (rejecting the endpoint's attempt at registration) or simply ignore the RRQ message at 1008. If S(Reg) equals 1, the gatekeeper transmits a RCF message and accepts the endpoint's registration at 1006.

Figure 11:
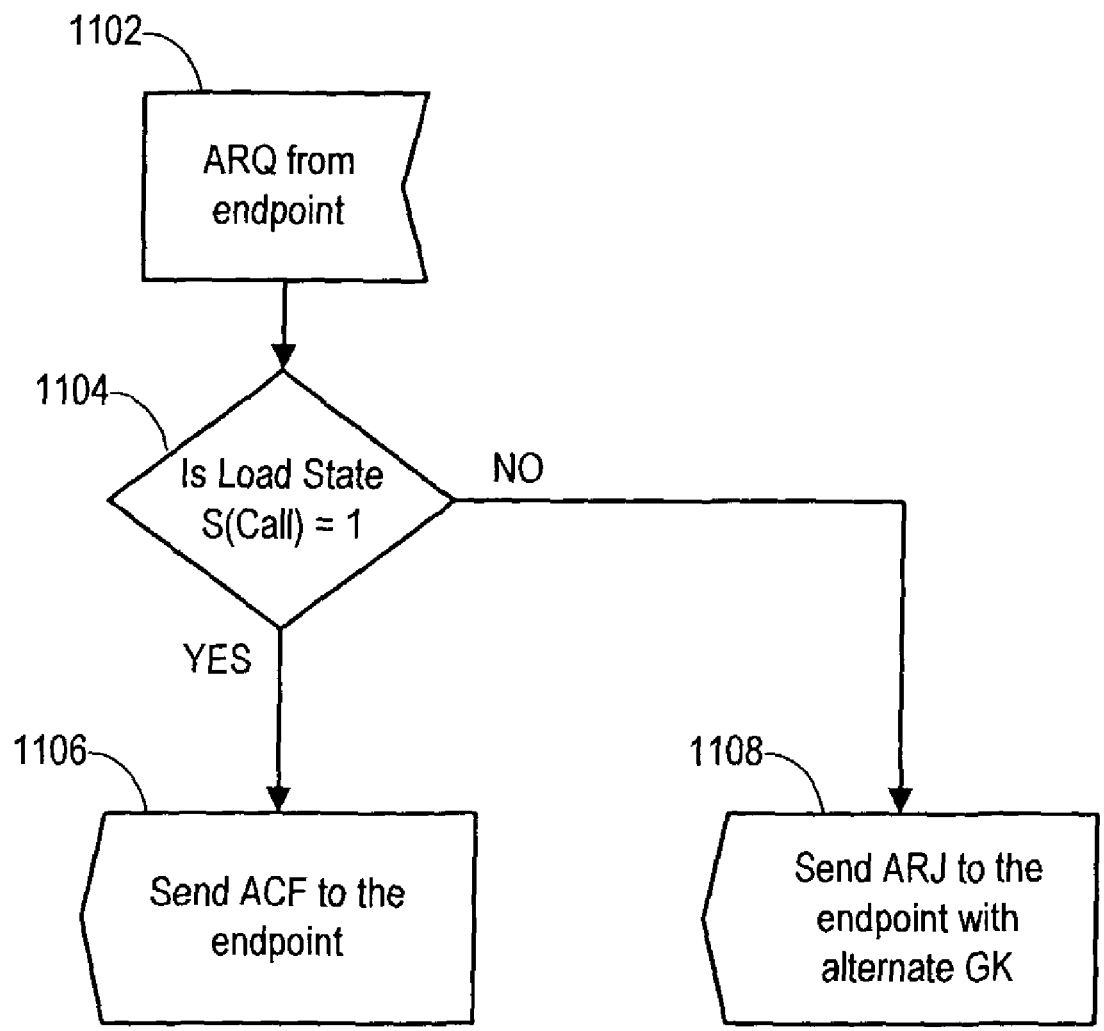
FIG. 11 is a flow chart of an ARQ method that may be performed by a gatekeeper according to some embodiments.

FIG. 11 is a flow chart of an ARQ method that may be performed by a gatekeeper according to some embodiments. When an ARQ message is received from an endpoint at 1102, the gatekeeper determines the value of S(Call) representing the gatekeeper's current call load state. If S(Call) equals 0 at 1104, the gatekeeper will transmit a ARJ message to the endpoint (refusing to admit the endpoint's call) at 1108. According to some embodiments, the gatekeeper also provides the endpoint with one or more alternate gatekeepers. If S(Call) equals 1, the gatekeeper transmits a ACF message and admits the endpoint's call at 1106.

Figure 12:
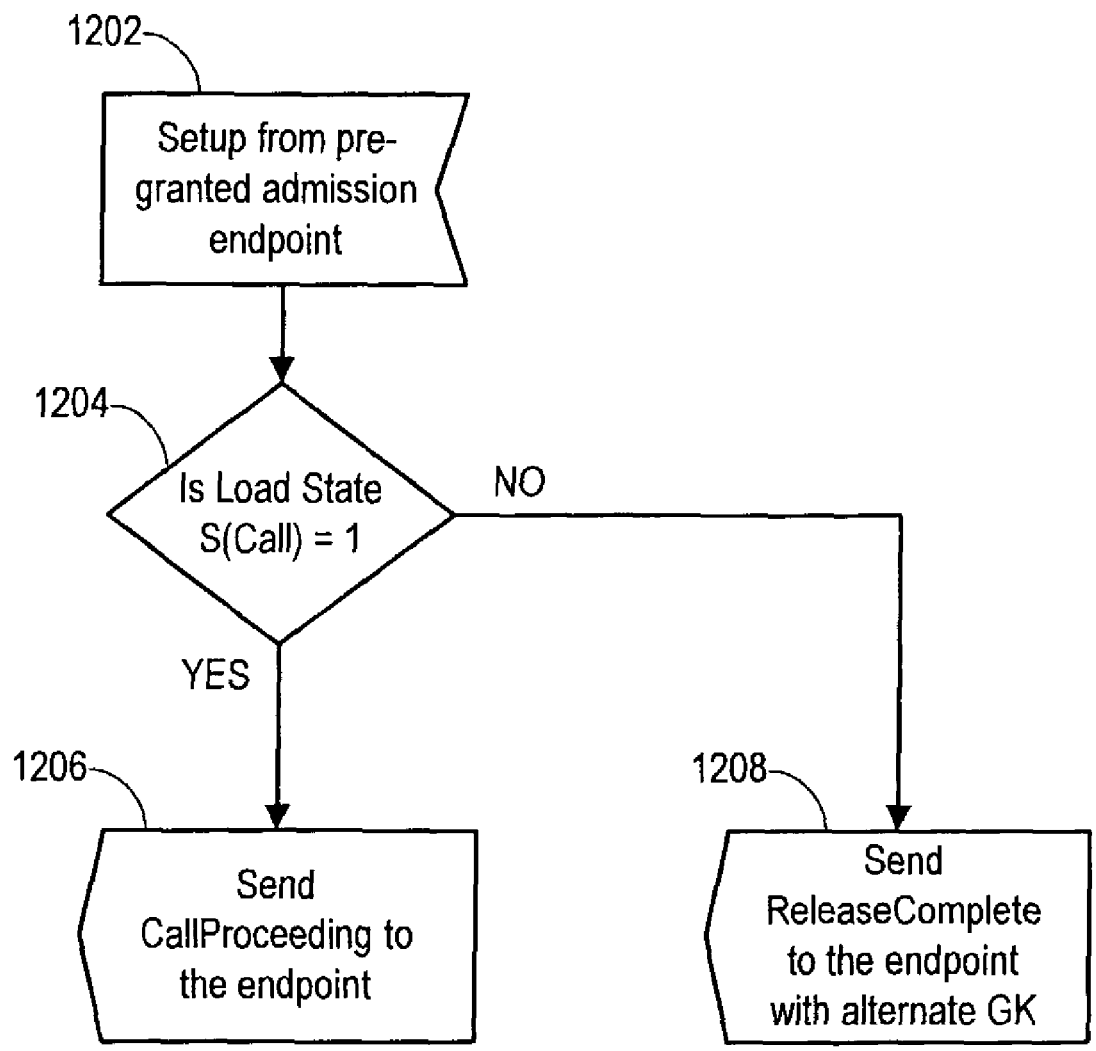
FIG. 12 is a flow chart of a pre-granted setup processing method that may be performed by a gatekeeper according to some embodiments.

FIG. 12 is a flow chart of a pre-granted setup processing method that may be performed by a gatekeeper according to some embodiments. In particular, when pre-granted admission has been setup for an endpoint at 1202, the gatekeeper will transmit a Release Complete message at 1208 when S(Call) equals 0 at 1204. If S(Call) equals 1, on the other hand, the gatekeeper will transmit a Call Proceeding to the endpoint at 1206.

Figure 13:
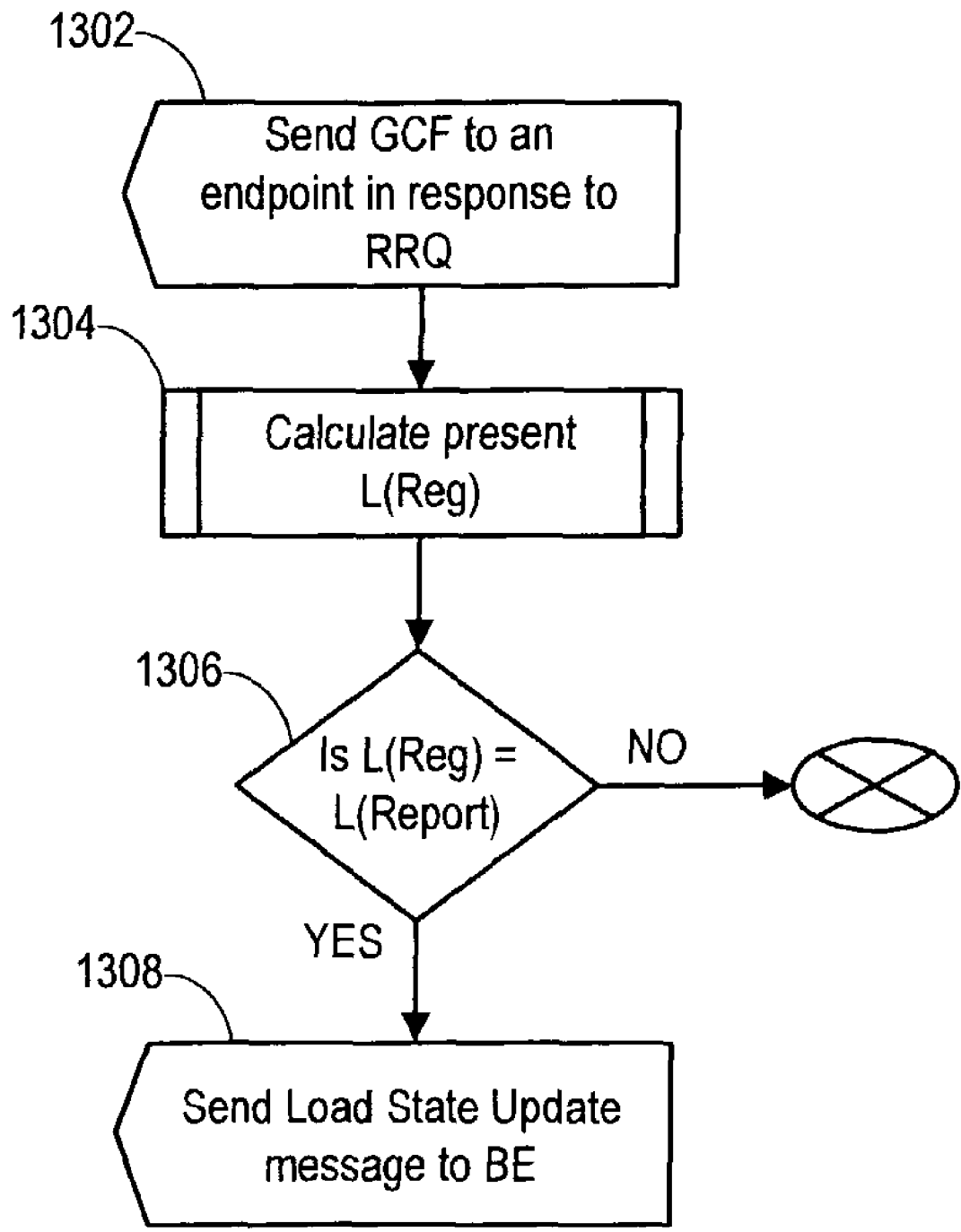
FIG. 13 is a flow chart of a registration load calculation method that may be performed by a gatekeeper according to some embodiments.

Note that each gatekeeper may periodically asses its own registration load, such as by calculating L(Reg). Each gatekeeper may then send a Load State Update message to the border element when L(Reg) reaches some pre-defined value. For example, each gatekeeper might be configured to send a Load State Update message when L(Reg) passes 10%, 20%, 30%, etc. FIG. 13 is a flow chart of a registration load calculation method that may be performed by a gatekeeper according to some embodiments. In particular, each time a GCF is transmitted to an endpoint at 1302, L(Reg) is calculated at 1304. If the new value of L(Reg) equals a reporting threshold L(Report) at 1306, a Load State Update message is transmitted to the border element at 1308.

Figure 14:
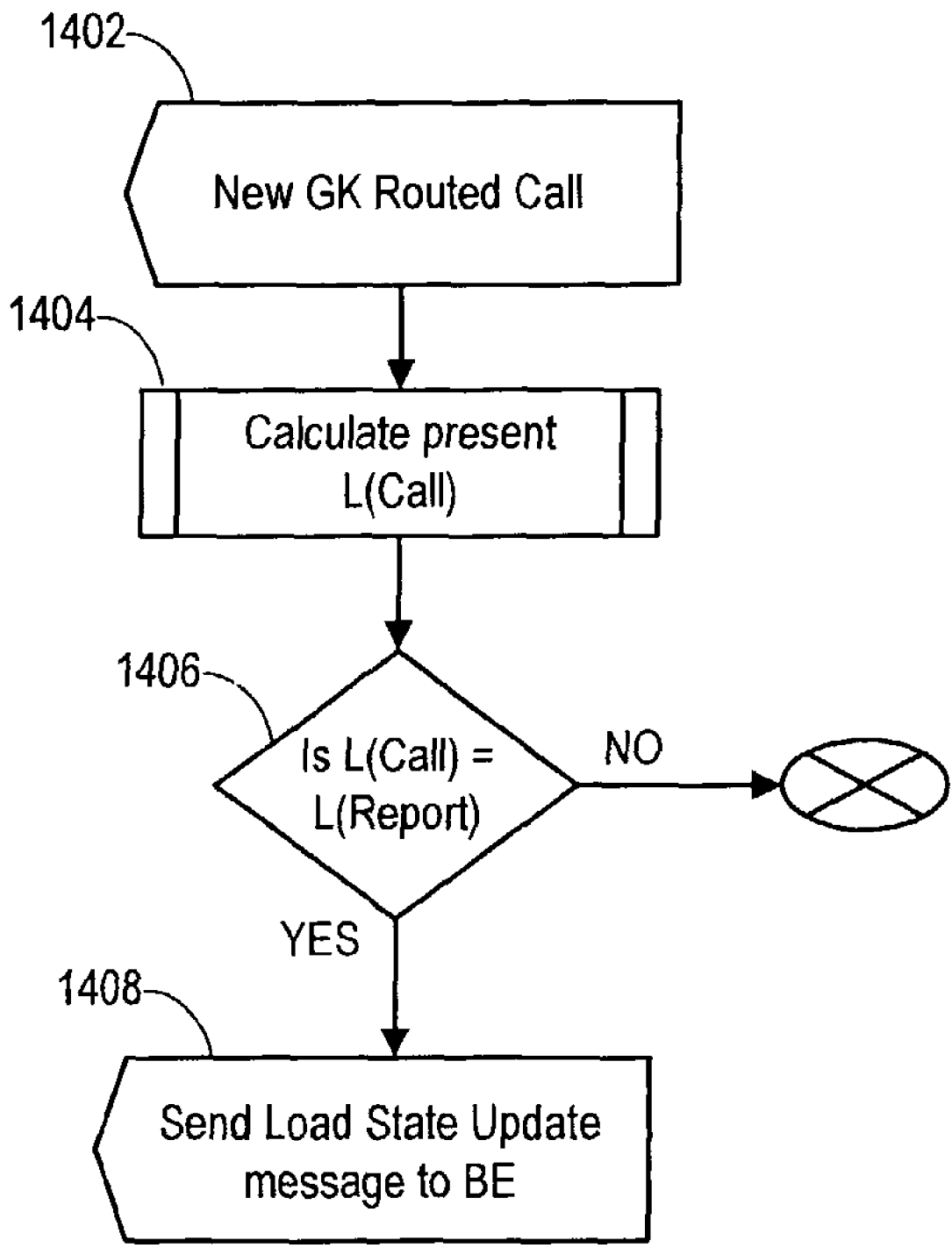
FIG. 14 is a flow chart of a call load calculation method that may be performed by a gatekeeper according to some embodiments.

Similarly, each gatekeeper may periodically asses its own call load, such as by calculating L(Call). Each gatekeeper may then send a Load State Update message to the border element when L(Call) reaches some pre-defined value. For example, each gatekeeper might be configured to send a Load State Update message when L(Call) rises above or falls below 75%. FIG. 14 is a flow chart of a call load calculation method that may be performed by a gatekeeper according to some embodiments. In particular, each time a new call is routed by the gatekeeper at 1402, L(Call) is calculated at 1404. If the new value of L(Calls) equals a reporting threshold L(Report) at 1406, a Load State Update message is transmitted to the border element at 1408.

Figure 15:
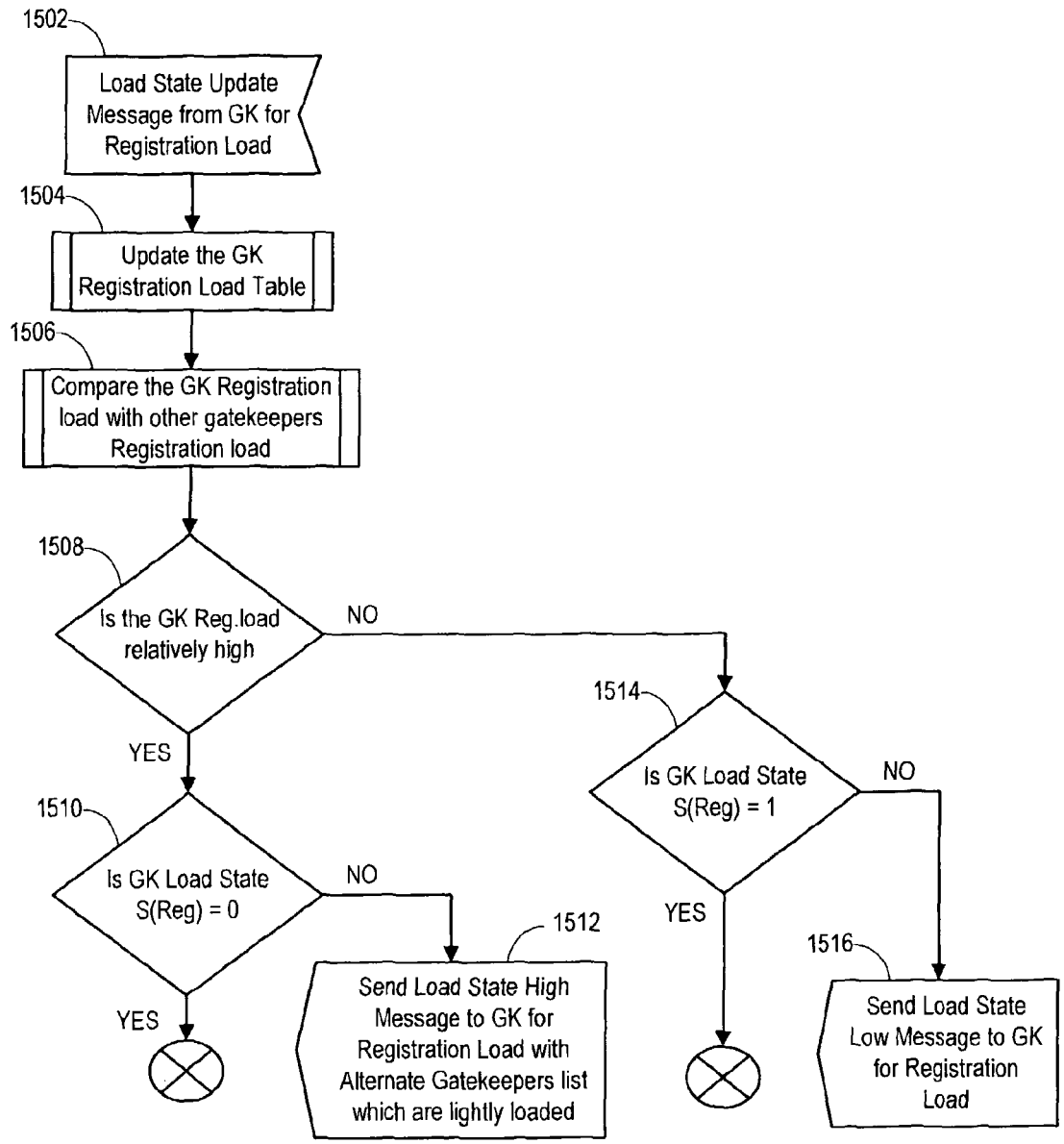
FIG. 15 is a flow chart of a registration load state update message method that may be performed by a border element according to some embodiments.

In this way, the border element receives Load State Update messages from the gatekeepers within the administrative domain. FIG. 15 is a flow chart of a registration Load State Update message method that may be performed by the border element according to some embodiments. When the border element receives a Load State Update Message associated with a gatekeeper's registration load at 1502, the gatekeeper's information is updated in a registration load table at 1504. The border element also compares that gatekeeper's registration load with the other gatekeepers in the administrative domain at 1506.

If the gatekeeper has a relatively high registration load at 1508, the border element determines if S(Reg) for that gatekeeper is already 0 (i.e., indicating that it is not accepting further registrations). If S(Reg) is already 0 at 1510, nothing further needs to be done. If S(Reg) is currently 1, the border element transmits a Load State High message to the gatekeeper (perhaps including a list of alternate gatekeepers) at 1512.

If the gatekeeper does not have a relatively high registration load, the border element determines if S(Reg) for that gatekeeper is already 1 (i.e., indicating that it will accept further registrations). If S(Reg) is already 1 at 1514, nothing further needs to be done. If S(Reg) is currently 0, the border element transmits a Load State Low message to the gatekeeper (indicating that it should accept further registrations) at 1516.

Figure 16:
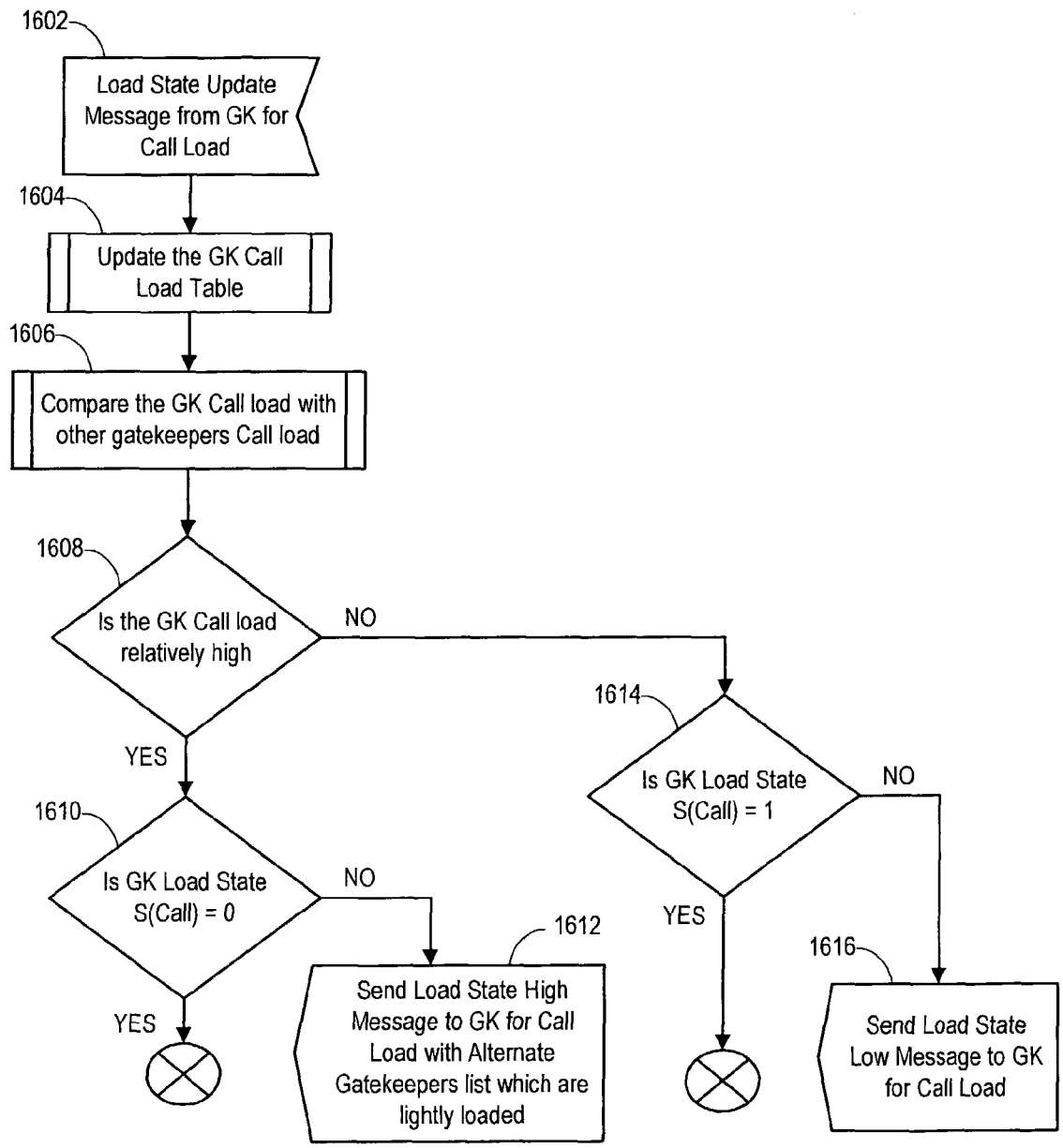
FIG. 16 is a flow chart of a call load state update message method that may be performed by a border element according to some embodiments.

Similarly, FIG. 16 is a flow chart of a call load state update message method that may be performed by a border element according to some embodiments. When the border element receives a Load State Update Message associated with a gatekeeper's call load at 1602, the gatekeeper's information is updated in a call load table at 1604. The border element also compares that gatekeeper's call load with the other gatekeeper's in the administrative domain at 1606.

If the gatekeeper has a relatively high call load at 1608, the border element determines if S(Call) for that gatekeeper is already 0 (i.e., indicating that it is not routing further calls). If S(Call) is already 0 at 1610, nothing further needs to be done. If S(Call) is currently 1, the border element transmits a Load State High message to the gatekeeper (perhaps including a list of alternate gatekeepers) at 1612.

If the gatekeeper does not have a relatively high call load, the border element determines if S(Call) for that gatekeeper is already 1 (i.e., indicating that it will route further calls). If S(Call) is already 1 at 1614, nothing further needs to be done. If S(Call) is currently 0, the border element transmits a Load State Low message to the gatekeeper (indicating that it should begin to route additional calls) at 1616.

Figure 17:
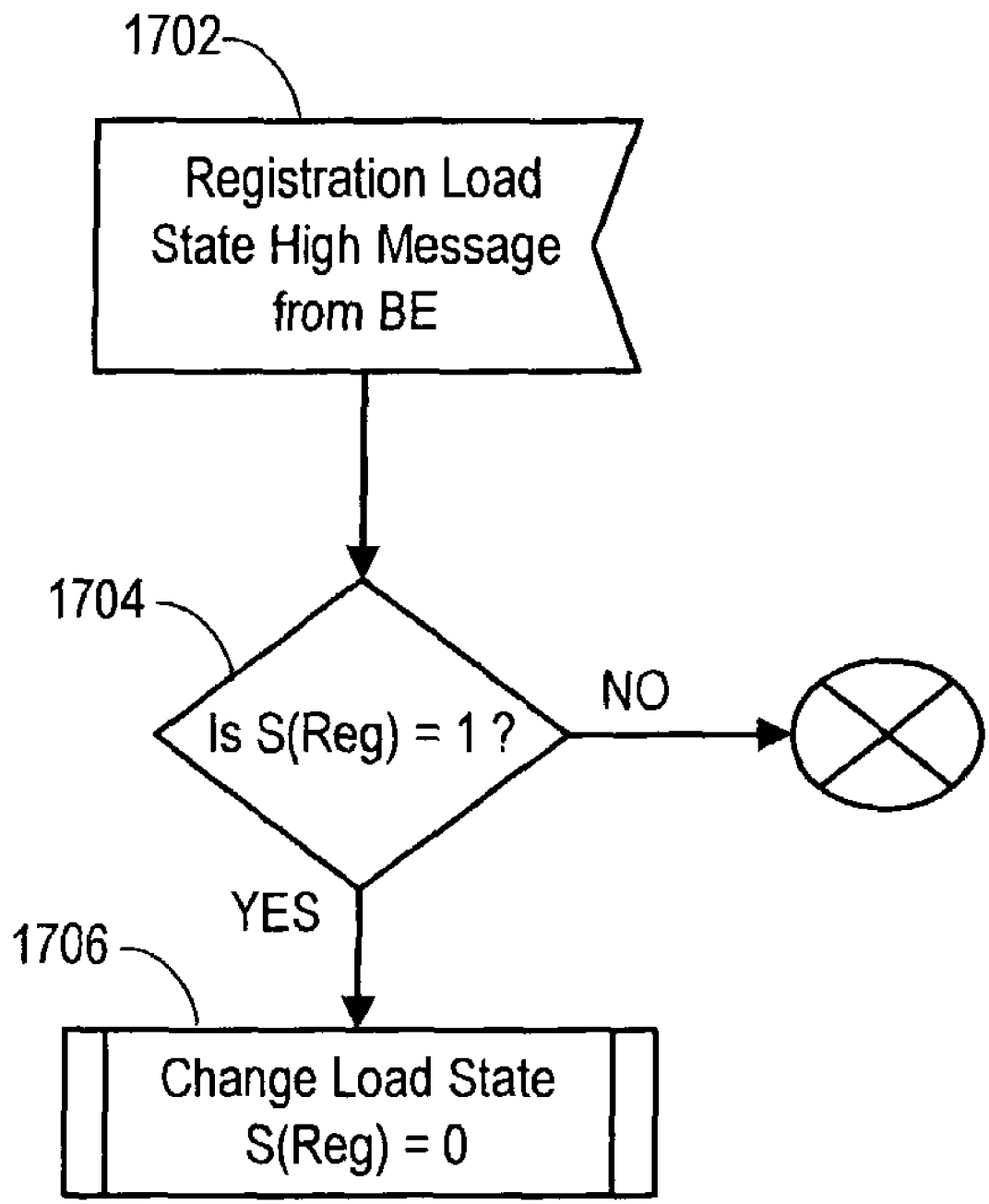
FIG. 17 is a flow chart of a registration load state high message method that may be performed by a gatekeeper according to some embodiments.

FIG. 17 is a flow chart of a registration Load State High message method that may be performed by a gatekeeper according to some embodiments. When the gatekeeper receives a Load State High message associated with registration load at 1702, it sets S(Reg) to 0 at 1704 and 1706 and will therefore: (i) no longer respond to GRQ messages or respond with a GRJ message and (ii) provide RRJ messages in response to any further RRQ messages from endpoints.

Figure 18:
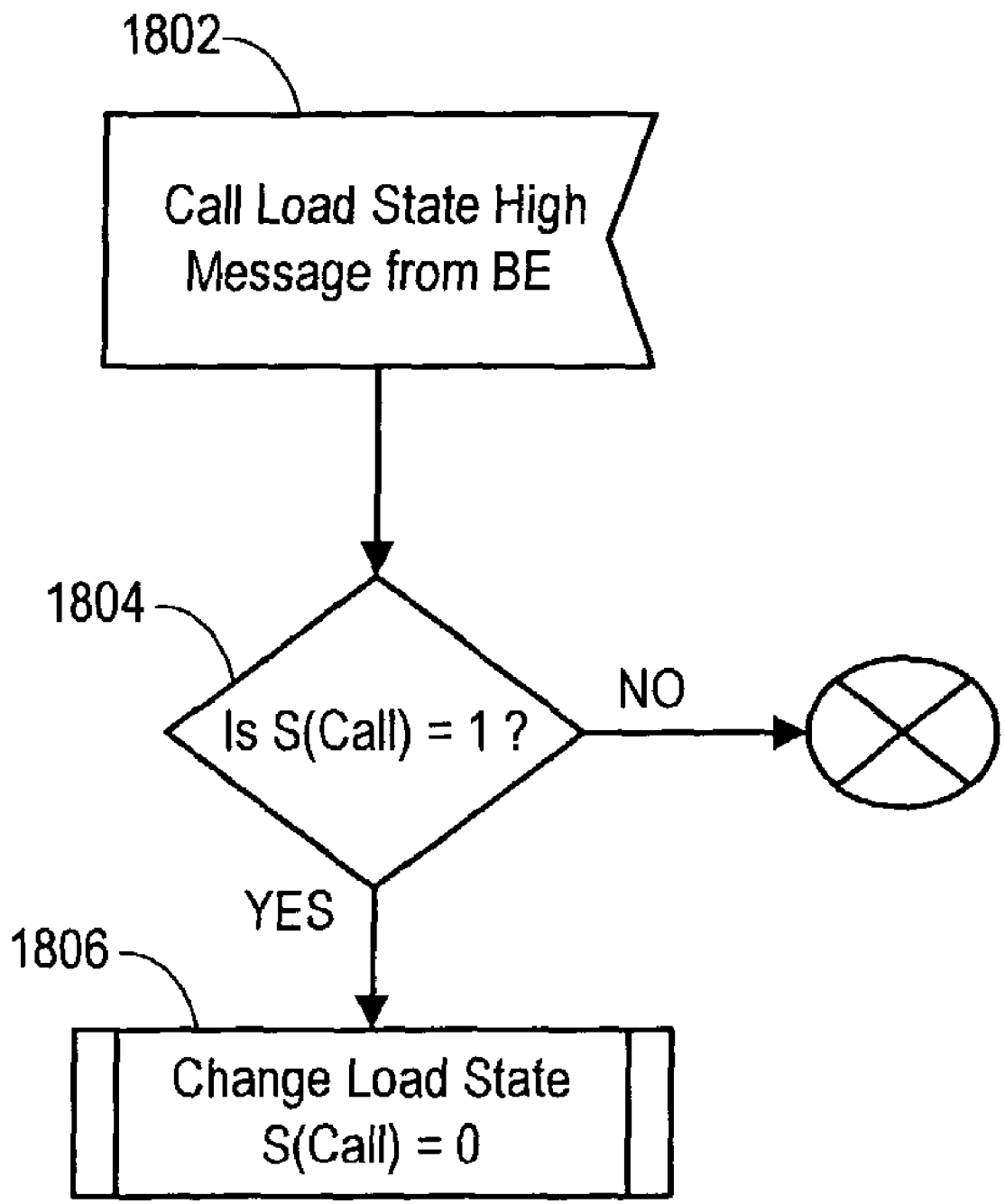
FIG. 18 is a flow chart of a call load state high message method that may be performed by a gatekeeper according to some embodiments.

FIG. 18 is a flow chart of a call Load State High message method that may be performed by a gatekeeper according to some embodiments. When the gatekeeper receives a Load State High message associated with call load at 1802, it sets S(Call) to 0 at 1804 and 1806 and will therefore provide ARJ messages (e.g., indicating "resourcesUnAvailable") in response to any further ARQ messages from endpoints. According to some embodiments, a gatekeeper may also reject registration and/or discovery requests when S(Call) equals 0.

Figure 19:
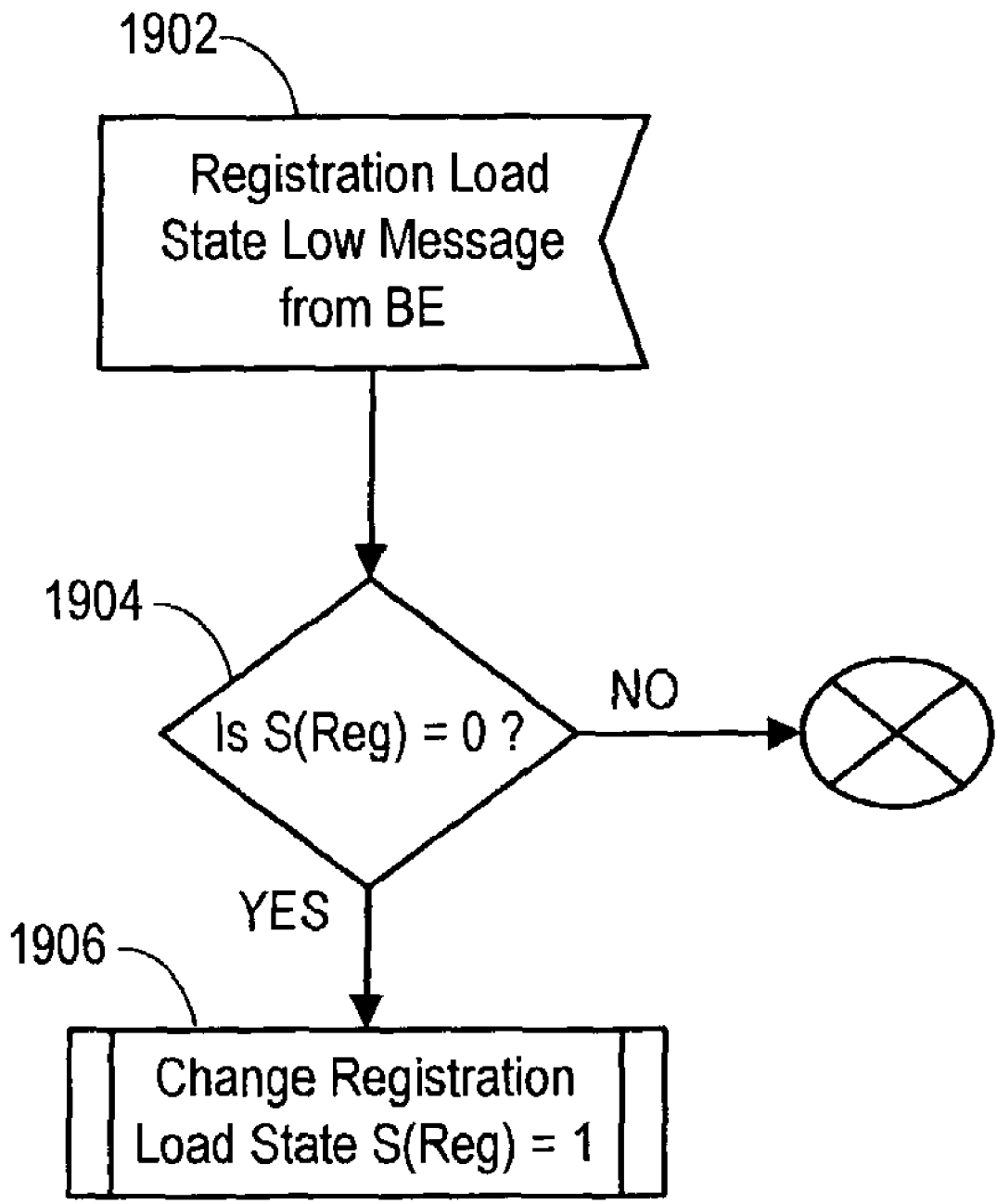
FIG. 19 is a flow chart of a load state low message for registration load method that may be performed by a gatekeeper according to some embodiments.

When the border element determines that a gatekeeper having a current S(Reg) of 0 is lightly loaded as compared to other gatekeepers, it transmits a Load State Low to that gatekeeper. FIG. 19 is a flow chart of a Load State Low message for registration load method that may then be performed by that gatekeeper according to some embodiments. In particular, when the Load State Low message associated with registration load is received from the border element at 1900, the gatekeeper ensures that S(Reg) is set to 1 at 1904 and 1906 (and will begin replaying to GRQ/RRQ messages with GCF/RCF messages as appropriate).

Figure 20:
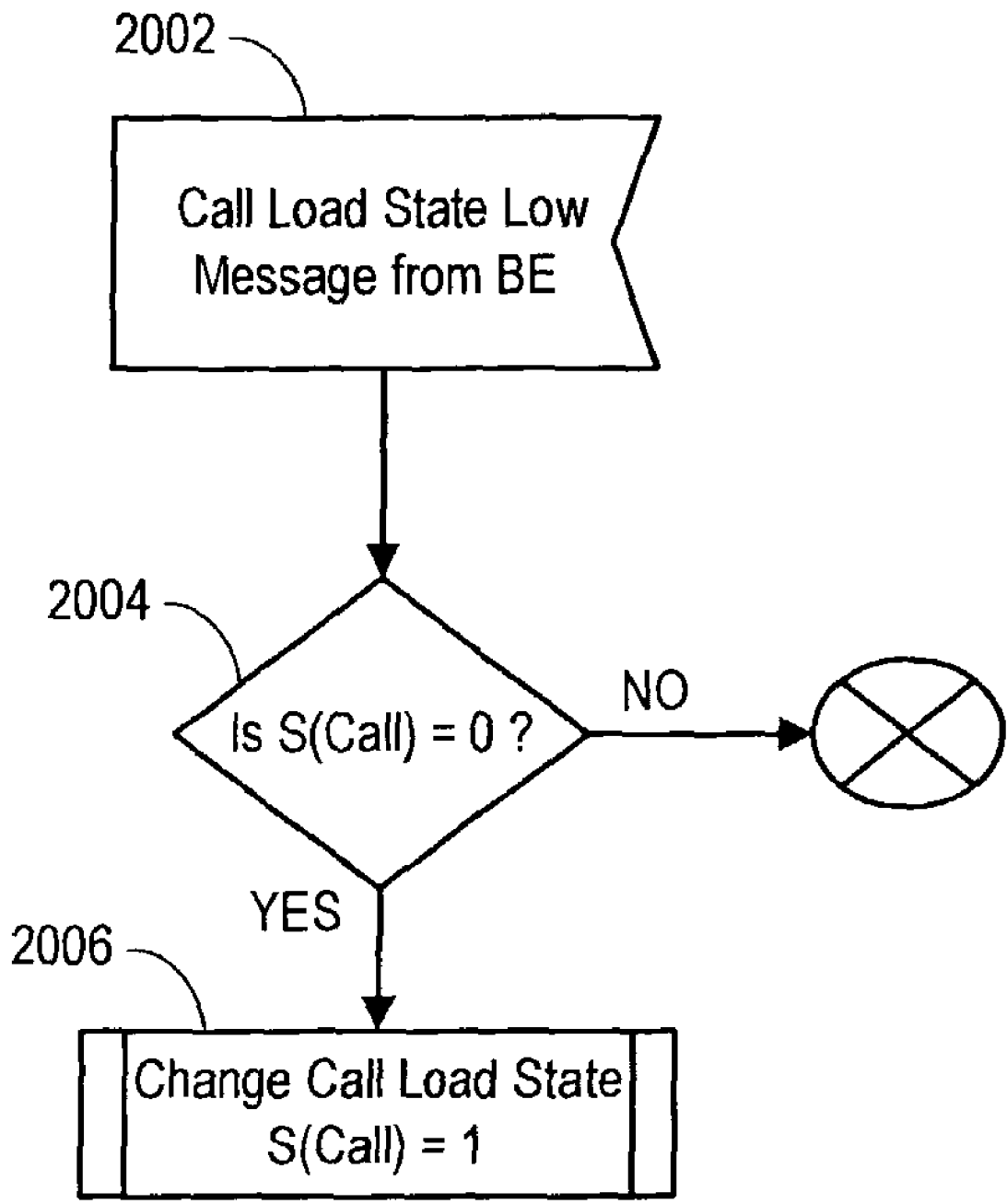
FIG. 20 is a flow chart of a load state low message for call load method that may be performed by a gatekeeper according to some embodiments.

Similarly, when the border element determines that a gatekeeper having a current S(Call) of 0 is lightly loaded as compared to other gatekeepers, it transmits a Load State Low to that gatekeeper. FIG. 20 is a flow chart of a Load State Low message for call load method that may be performed by a gatekeeper according to some embodiments. In particular, when the Load State Low message associated with call load is received from the border element at 2002, the gatekeeper ensures that S(Call) is set to 1 at 2004 and 2006 (and will begin replaying to ARQ messages with ACF messages).

Figure 21:
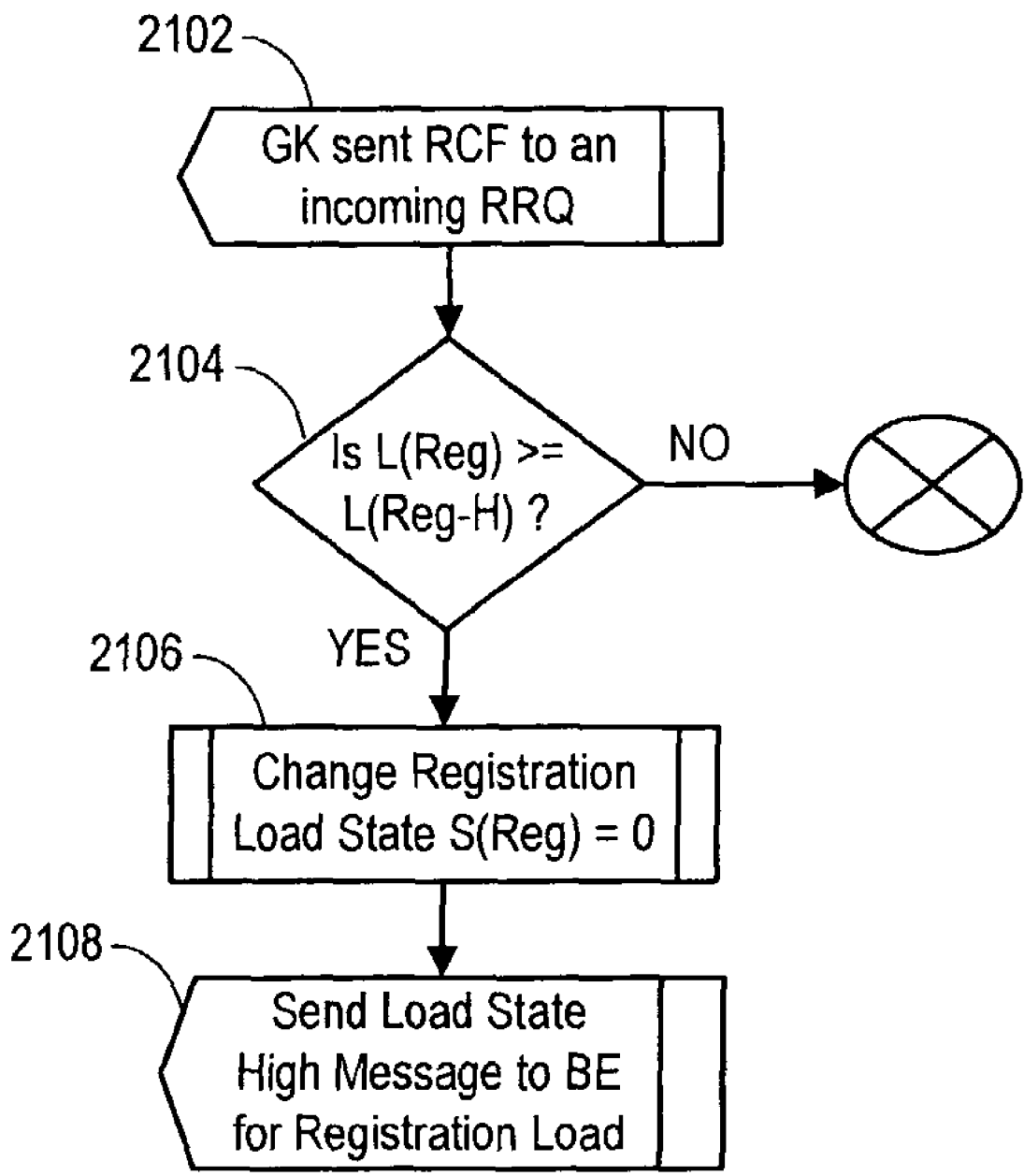
FIG. 21 is a flow chart of a high registration load threshold method that may be performed by a gatekeeper according to some embodiments.

According to some embodiments, a gatekeeper may be configured with a high registration load threshold value, L(Reg-H), and a high call load threshold value, L(Call-H). FIG. 21 is a flow chart of a high registration load threshold method that may be performed by a gatekeeper according to some embodiments. In particular, when the gatekeeper transmits a RCF message to an endpoint at 2102 it determines if L(Reg) is now greater than or equal to L(Reg-H) at 2104. If so, S(Reg) is set to 0 at 2106 (preventing further registrations) and a Load State High message associated with registration load is transmitted to the border element at 2108.

Figure 22:
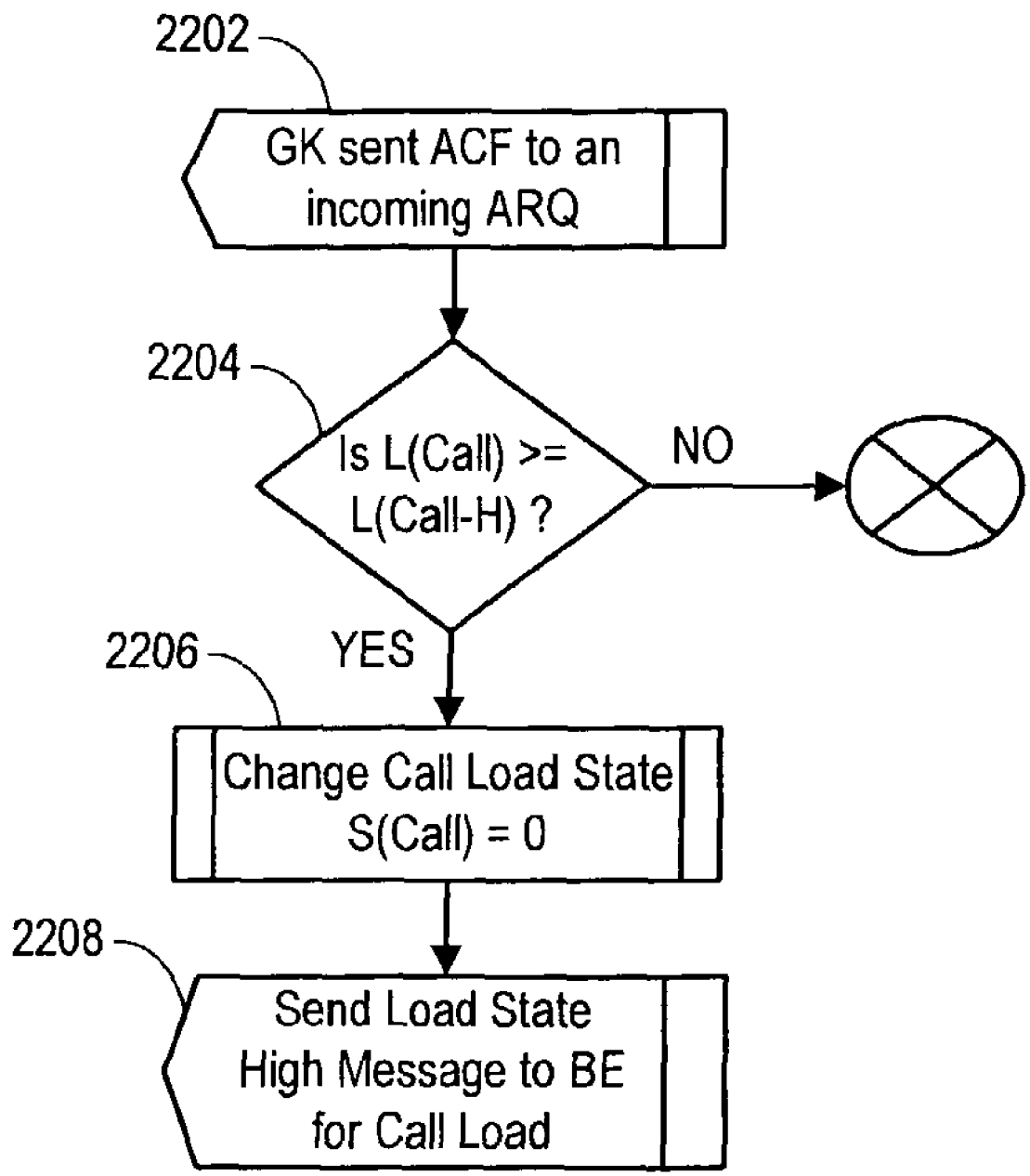
FIG. 22 is a flow chart of a high call load threshold method that may be performed by a gatekeeper according to some embodiments.

Similarly, FIG. 22 is a flow chart of a high call load threshold method that may be performed by a gatekeeper according to some embodiments. When the gatekeeper transmits a ACF message to an endpoint at 2202, it determines if L(Call) is now greater than or equal to L(Call-H) at 2204. If so, S(Call) is set to 0 at 2206 (preventing further calls from being routed through that gatekeeper) and a Load State High message associated with call load is transmitted to the border element at 2208.

Figure 23:
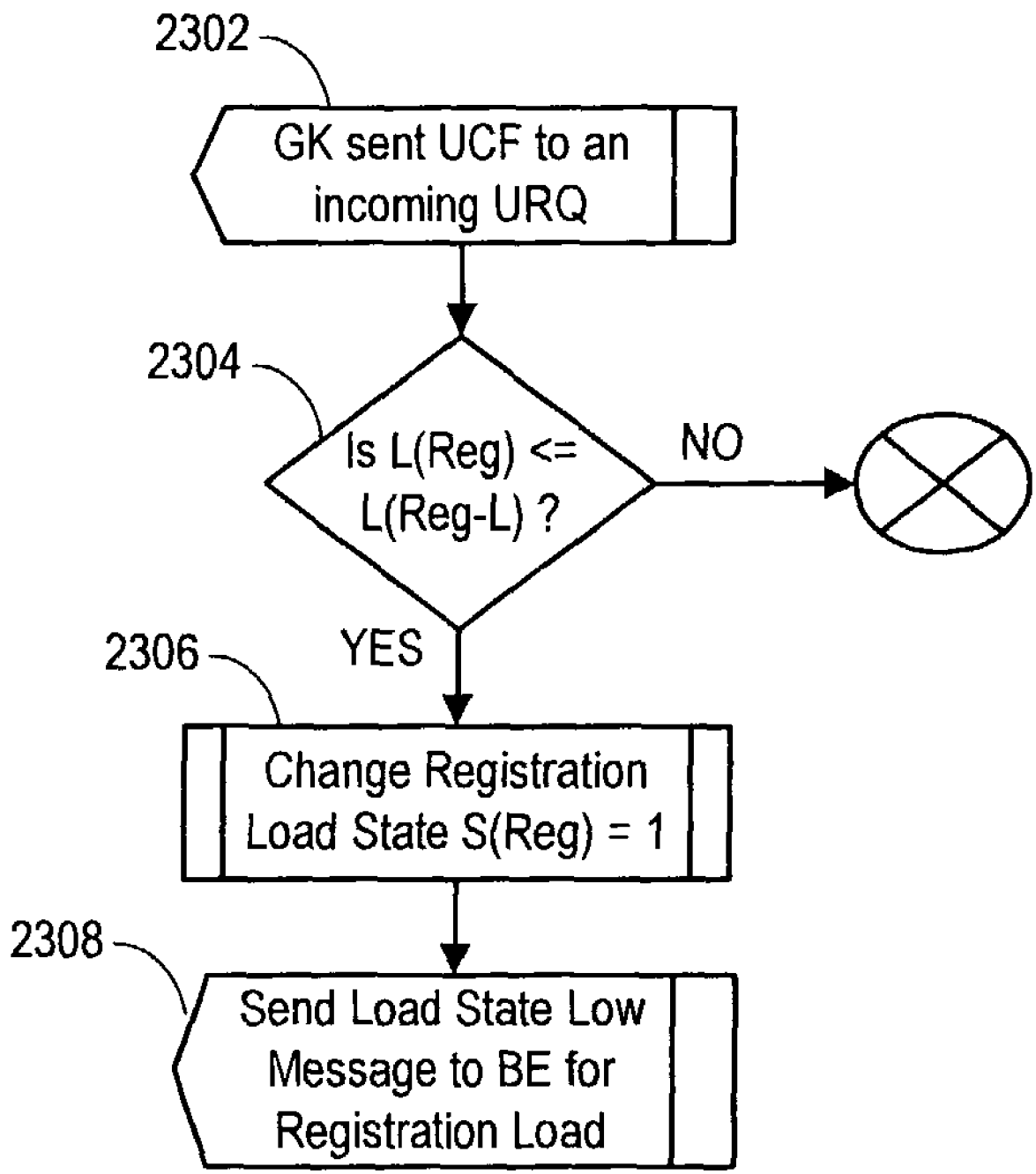
FIG. 23 is a flow chart of a low registration load threshold value method that may be performed by a gatekeeper according to some embodiments.

A gatekeeper might also be configured with a low registration load threshold value, L(Reg-L), and a low call load threshold value, L(Call-L). FIG. 23 is a flow chart of a low registration load threshold value method that may be performed by a gatekeeper according to some embodiments. In particular, when the gatekeeper transmits a UCF message to an endpoint at 2302 (in response to a URQ request from an endpoint to be un-registered), it determines if L(Reg) is now less than or equal to L(Reg-L) at 2304. If so, S(Reg) is set to 1 at 2306 (allowing further registrations) and a Load State Low message associated with registration load is transmitted to the border element at 2308.

Figure 24:
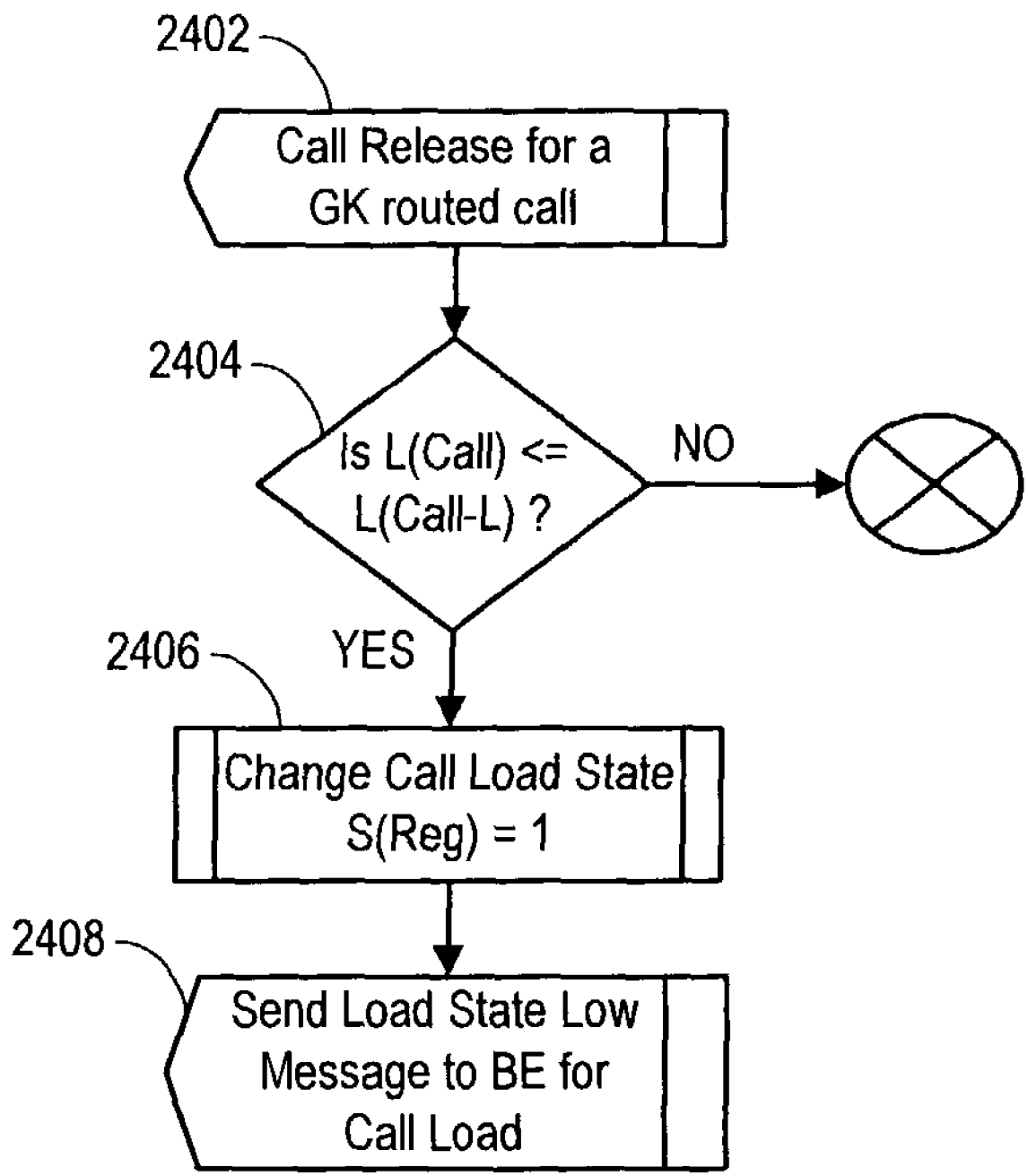
FIG. 24 is a flow chart of a low call load threshold value method that may be performed by a gatekeeper according to some embodiments.

Similarly, FIG. 24 is a flow chart of a low call load threshold value method that may be performed by a gatekeeper according to some embodiments. When a gatekeeper-routed call is released at 2402, the gatekeeper determines if L(Call) is now less than or equal to L(Call-L) at 2404. If so, S(Call) is set to 1 at 2406 (allowing a new call to be routed through that gatekeeper) and a Load State Low message associated with call load is transmitted to the border element at 2408.

When the border element receives a Load State Low from a particular gatekeeper, the gatekeeper may be listed as an alternate gatekeeper (e.g., in messages to other gatekeepers that are not accepting further registrations and/or calls). On the other hand, when the border element receives a Load State High from a particular gatekeeper, the gatekeeper may no longer be included as an alternate gatekeeper.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

According to some embodiments provided herein, a border element acts as a centralized load distribution element for gatekeepers within an administrative domain. According to other embodiments, however, a particular gatekeeper might be designated as a centralized load distribution element for other gatekeepers within an administrative domain. Similarly, an independent, centralized load distribution device could be provided for gatekeepers within an administrative domain.

The several embodiments described herein are solely for the purpose of illustration. Persons skilled in the art will recognize from this description other embodiments may be practiced with modifications and alterations limited only by the claims.

What is claimed is:

1. A border element apparatus associated with an administrative domain of an H.323 network, comprising:
a storage device to store load information associated with a first message type and a second message type from a plurality of gatekeepers of the H.323 network; and
a load distribution unit to adjust a first load associated with the first message type for one gatekeeper based on load information associated with at least one other gatekeeper and to adjust a second load associated with the second message type for one gatekeeper based on load information associated with at least one other gatekeeper.

2. The apparatus of claim 1, wherein the first message type is associated with a current registration load, and the second message type is associated with a current call load.

3. The apparatus of claim 1, wherein the load information is associated with at least one of (i) a load state update or (ii) a load state query response received from a gatekeeper.

4. The apparatus of claim 1, wherein the load information is associated with at least one of (i) a load state high indication or (ii) a load state low indication received from a gatekeeper.

5. The apparatus of claim 1, wherein the load distribution unit is further to provide a load state query to a gatekeeper.

6. The apparatus of claim 1, wherein the load distribution unit is to adjust a load associated with the gatekeeper via at least one of a (i) load state high indication or (ii) a load state low indication provided to the gatekeeper.

7. A method, comprising:
receiving call load information from a plurality of H.323 gatekeepers in an H.323 network;
receiving registration load information from a plurality of H.323 gatekeepers in an H.323 network:
arranging for a registration load associated with one H.323 gatekeeper to be adjusted based on registration load information associated with at least one other H.323 gatekeeper;and
arranging for a call load associated with one H.323 gatekeeper to be adjusted based on call load information associated with at least one other H.323 gatekeeper.

8. The method of claim 7, wherein the H.323 gatekeepers are associated with an administrative domain.

9. The method of claim 8, wherein said arranging is performed by a border element associated with the administrative domain.

10. The method of claim 7, wherein the load information is associated with at least one of (i) a load state update or (ii) a load state query response received from a gatekeeper.

11. The method of claim 7, wherein the load information is associated with at least one of (i) a load state high indication or (ii) a load state low indication received from a gatekeeper.

12. The method of claim 7, further comprising:
providing a load state query to a gatekeeper.

13. The method of claim 7, wherein said arranging is performed via at least one of a (i) load state high indication or (ii) a load state low indication provided to the gatekeeper.

14. A medium storing instructions adapted to be executed by a processor to perform a method, said method comprising:
  receiving call load information from a plurality of H.323 gatekeepers in an H.323 network:
  receiving registration load information from a plurality of H.323 gatekeepers in an H.323 network:
  arranging for a registration load associated with one H.323 gatekeeper to be adjusted based on registration load information associated with at least one other H.323 gatekeeper; and
  arranging for a call load associated with one H.323 gatekeeper to be adjusted based on call load information associated with at least one other H.323gatekeeper.

15. The medium of claim 14, wherein the gatekeepers are associated with an administrative domain.

16. The medium of claim 15, wherein said arranging is performed by a border element associated with the administrative domain.

17. The medium of claim 14, wherein the load information is associated with at least one of (i) a load state update or (ii) a load state query response received from a gatekeeper.

18. The medium of claim 14, wherein the load information is associated with at least one of (i) a load state high indication or (ii) a load state low indication received from a gatekeeper.

19. The medium of claim 14, wherein said method further comprises:
  providing a load state query to a gatekeeper.

20. The medium of claim 14, wherein said arranging is performed via at least one of a (i) load state high indication or (ii) a load state low indication provided to the gatekeeper.

21. An apparatus, comprising:
  a storage device to store load information to be provided to a centralized load distribution element associated with an H.323 network; and
  a load adjustment unit to adjust a first load associated with a first message type for one gatekeeper based on load information associated with at least one other gatekeeper and to adjust a second load associated with a second message type for one gatekeeper based on load information associated with at least one other gatekeeper.

22. The apparatus of claim 21, wherein the load adjustment unit is associated with a gatekeeper in an administrative domain.

23. The apparatus of claim 21, wherein the load information is associated with at least one of: (i) a current registration load, or (ii) a current call load.

24. A method, comprising:
  providing call load information to a centralized load distribution element associated with an H.323 network;
  providing registration load information to a centralized load distribution element associated with an H.323 network;
  adjusting a call load based on information received from the load distribution element; and
  adjusting a registration load based on information received from the load distribution element.

25. The method of claim 24, wherein said providing and adjusting are performed by a gatekeeper associated with an administrative domain.

26. The method of claim 24, wherein the load information is associated with at least one of: (i) a current registration load, or (ii) a current call load.

27. A medium storing instructions adapted to be executed by a processor to perform a method, said method comprising:
  providing call load information to a centralized load distribution element associated with an H.323 network;
  providing registration load information to a centralized load distribution element associated with an H.323 network;
  adjusting a call load based on information received from the load distribution element; and
  adjusting a registration load based on information received from the load distribution element.

28. The medium of claim 27, wherein said providing and adjusting are performed by a gatekeeper associated with an administrative domain.

* * * * *